(12) United States Patent
Marcovitch et al.

(10) Patent No.: US 12,174,765 B2
(45) Date of Patent: Dec. 24, 2024

(54) INTERRUPT EMULATION ON NETWORK DEVICES

(71) Applicant: MELLANOX TECHNOLOGIES, LTD., Yokneam (IL)

(72) Inventors: Daniel Marcovitch, Yokneam Illit (IL); Liran Liss, Atzmon-Segev (IL); Rabia Loulou, Nazareth (IL); Aviad Yehezkel, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 344 days.

(21) Appl. No.: 17/707,555

(22) Filed: Mar. 29, 2022

(65) Prior Publication Data

US 2023/0315659 A1 Oct. 5, 2023

(51) Int. Cl.
*G06F 13/24* (2006.01)
*G06F 13/40* (2006.01)
*G06F 13/42* (2006.01)
*G06F 15/173* (2006.01)

(52) U.S. Cl.
CPC .......... *G06F 13/24* (2013.01); *G06F 13/4022* (2013.01); *G06F 13/4072* (2013.01); *G06F 13/4221* (2013.01); *G06F 15/17331* (2013.01)

(58) Field of Classification Search
CPC .......... G06F 15/17331; G06F 13/4221; G06F 13/4072; G06F 13/4022; G06F 13/24; G06F 3/4221
See application file for complete search history.

(56) References Cited

U.S. PATENT DOCUMENTS

| 5,535,420 | A | * | 7/1996 | Kardach | ................. | G06F 13/24 |
| | | | | | | 710/48 |
| 5,854,908 | A | * | 12/1998 | Ogilvie | .................... | G06F 13/24 |
| | | | | | | 710/312 |
| 2002/0141418 | A1 | * | 10/2002 | Ben-Dor | ................... | H04L 9/40 |
| | | | | | | 370/398 |
| 2006/0218328 | A1 | * | 9/2006 | Vega | ....................... | G06F 13/26 |
| | | | | | | 710/260 |

(Continued)

OTHER PUBLICATIONS

"Xilinx Answer 72702 UltraScale and UltraScale+ PCIe Interrupt debug guide," Xilinx, © 2020, 22 pages.

(Continued)

*Primary Examiner* — Phong H Dang
(74) *Attorney, Agent, or Firm* — Sheridan Ross P.C.

(57) ABSTRACT

Methods, systems, and devices for message signaled interrupt (MSI-X) tunneling on a host device exposed by a bridge connection are described. A device may receive data and a first interrupt signal from a remote destination over a network protocol. The device may receive the data and/or the first interrupt signal over the bridge connection, via a tunneled communication from the remote destination. The device may generate a second interrupt signal based on the first interrupt signal and a local interrupt configuration provided by a system bus driver of the device. The device may inject the data and the second interrupt signal over the system bus. Injecting the data and injecting the second interrupt signal may include ensuring the data is made available to the system bus driver, prior to the interrupt handler receiving the second interrupt signal.

37 Claims, 12 Drawing Sheets

(56) References Cited

U.S. PATENT DOCUMENTS

| | | | | |
|---|---|---|---|---|
| 2010/0074264 | A1* | 3/2010 | Davis | G06F 13/24 |
| | | | | 370/401 |
| 2010/0169883 | A1* | 7/2010 | Bogin | G06F 13/24 |
| | | | | 718/1 |
| 2011/0040913 | A1* | 2/2011 | Chung | G06F 13/4022 |
| | | | | 710/264 |
| 2011/0197004 | A1* | 8/2011 | Serebrin | G06F 9/45558 |
| | | | | 710/267 |
| 2013/0322264 | A1* | 12/2013 | Campbell | G06F 13/24 |
| | | | | 370/392 |
| 2019/0227801 | A1* | 7/2019 | Sankaran | G06T 1/20 |
| 2022/0078043 | A1 | 3/2022 | Marcovitch et al. | |

OTHER PUBLICATIONS

Cheng-Chun Tu "Interrupts Delivery in a Multi-host Environment," Stony Brook University, Sep. 24, 2012, 29 pages [retrieved online from: www3.cs.stonybrook.edu/~live3/files/pcie-interrupt-delivery.pdf].

Young "ECR—Cardbus Header Proposal," Jun. 10, 2003, 23 pages [retrieved online from: www.cl.cam.ac.uk/~djm202/pdf/specifications/pci/msi-x_ecn.pdf.

* cited by examiner

INTERRUPT EMULATION ON NETWORK DEVICES

FIELD OF TECHNOLOGY

The present disclosure relates to message signaled interrupts (MSI) and, for example, to MSI-X tunneling on a host device exposed by a bridge connection.

BACKGROUND

Some systems may support peripheral component interconnect express (PCIe) connectivity between devices over a network. Improved techniques associated with PCIe communications (e.g., tunneled PCIe communications) are desired.

SUMMARY

The described techniques relate to improved methods, systems, devices, and apparatuses that support MSI-X emulation on a PCIe device (e.g., a network-tunneled PCIe device).

Examples may include one of the following features, or any combination thereof

An apparatus including: a system bus driver; and electronic circuitry. The electronic circuitry: receives a first interrupt signal from a remote destination over a network protocol; and generates a second interrupt signal based on the first interrupt signal and a local interrupt configuration provided by the system bus driver, where the second interrupt signal includes a local interrupt.

In some aspects, the apparatus includes a system bus. The electronic circuitry: receives data from the remote destination over the network protocol; injects the data over the system bus; and injects the second interrupt signal over the system bus, where injecting the data and injecting the second interrupt signal include ensuring the data is made available to the system bus driver, prior to the interrupt handler receiving the second interrupt signal.

In some aspects, the data is received as part of a network packet, the network packet including at least one of: a peripheral component interconnect express (PCIe) transaction layer packet (TLP); an explicit network request for data write; and a remote direct memory access (RDMA) write.

In some examples, the apparatus further includes: a first emulated device configured to receive at least one of the first interrupt signal and the data from at least one of a remote device, a second emulated device, and software over the network protocol, where the at least one of the remote device, the second emulated device, and the software are located at the remote destination.

In some aspects, the electronic circuitry: establishes a bridge connection between the apparatus and the remote destination; and receives a tunneled communication from the remote destination, over the bridge connection, where the tunneled communication includes the first interrupt signal, the data, or both.

In some aspects, the first interrupt signal is received as part of a network packet, the network packet including a PCIe TLP.

In some aspects, the first interrupt signal is received as part of a network packet, the network packet including an explicit network request for the first interrupt signal.

In some aspects, the first interrupt signal is indicated by an XRC number included in a network packet.

In some examples, the apparatus further includes: a first emulated device configured to receive the first interrupt signal from at least one of a remote device, a second emulated device, and software over the network protocol, where the at least one of the remote device, the second emulated device, and the software are located at the remote destination.

In some aspects, the electronic circuitry: establishes a bridge connection between the apparatus and the remote destination; and receives a tunneled communication from the remote destination, over the bridge connection, where the tunneled communication includes the first interrupt signal.

In some aspects, the system bus includes: a PCI bus; a PCIe bus; an Nvlink bus; or a compute express link (CXL) bus.

In some aspects, the electronic circuitry: identifies, from a set of interrupt handlers of a first emulated device, an interrupt handler corresponding to a sender of the first interrupt signal; and processes the first interrupt signal at the interrupt handler. In some aspects, processing the first interrupt signal at the interrupt handler includes at least one of: the generating of the second interrupt signal; and the injecting of the second interrupt signal over the system bus.

In some aspects, the first interrupt signal includes an message signaled interrupt (MSI) message, an MSI-X message, or a PCI-compatible interrupt hardware support (INTx) emulation.

In some aspects, the second interrupt signal includes a message signaled interrupt (MSI) message, an MSI-X message, or a PCI-compatible INTx emulation.

In some aspects, generating the second interrupt signal is based on a comparison of first information corresponding to the first interrupt signal to second information stored in a registry associated with a set of candidate interrupt signals. The first information includes at least one of: address information, a data value, a source network address, a source queue pair (QP), a source requestor identifier, a source process address space identifier (PASID), a destination network address, a destination QP, and an extended reliable connected (XRC) number associated with the first interrupt signal. The second information includes at least one of: address information, a data value, a destination system bus, a requestor identifier, and a PASID associated with the set of candidate interrupt signals.

In some aspects, the electronic circuitry: configures a registry associated with a set of candidate interrupt signals, where: the registry includes a set of local interrupt configurations, address information, data values, and masking information corresponding to the set of candidate interrupt signals; the set of local interrupt configurations includes the local interrupt configuration; and the set of candidate interrupt signals includes the first interrupt signal.

In some aspects, generating the second interrupt signal is based on at least one of: an indication of a protocol corresponding to the first interrupt signal; and a result associated with a query associated with the first interrupt signal.

In some aspects, the electronic circuitry: receives a set of data-write commands over a network; and orders the set of data-write commands based on a set of ordering rules, where generating the second interrupt signal is based on completing the ordering of the set of data-write commands.

In some aspects, the electronic circuitry: detects a masking state of the first interrupt signal; and generates the second interrupt signal based on detecting that the masking state is an unmasked state.

In some aspects, the electronic circuitry: injects the second interrupt signal over the system bus, where injecting the second interrupt signal includes transmitting the second interrupt signal to at least one of second electronic circuitry and the system bus driver.

An apparatus including: a system bus; and electronic circuitry. The electronic circuitry: receives a first interrupt signal from a device over the system bus, the first interrupt signal including a first local interrupt; generates a second interrupt signal based on the first interrupt signal; and transmits the second interrupt signal to a remote destination over a network protocol.

In some aspects, the electronic circuitry: receives data over the system bus; and transmits the data to the remote destination over the network protocol.

In some aspects, the electronic circuitry transmits the data as part of a network packet, the network packet including at least one of: a PCIe TLP; an explicit network request for data write; and an RDMA write.

In some aspects, the electronic circuitry: establishes a bridge connection between the apparatus and the remote destination; and transmits a tunneled communication to the remote destination, over the bridge connection, where the tunneled communication includes the second interrupt signal, the data, or both.

In some aspects, the electronic circuitry: generates a network packet indicating the second interrupt signal; and transmits the network packet to the remote destination over the network protocol.

In some aspects, the electronic circuitry transmits the second interrupt signal as part of a network packet, the network packet including a PCIe TLP.

In some aspects, the electronic circuitry transmits the second interrupt signal as part of a network packet, the network packet including an explicit network request for the second interrupt signal.

In some aspects, the electronic circuitry transmits the second interrupt signal and an XRC number as part of a network packet; and the second interrupt signal is indicated by the XRC number included in the network packet.

In some aspects, the electronic circuitry: establishes a bridge connection between the apparatus and the remote destination; and transmits a tunneled communication to the remote destination, over the bridge connection, where the tunneled communication includes the second interrupt signal.

In some aspects, the system bus includes: a PC) bus; a PCIe bus; an Nvlink bus; or a CXL bus.

In some aspects, the second interrupt signal includes an MSI message, an MSI-X message, or a PCI-compatible INTx emulation.

In some aspects, generating the second interrupt signal is based on address information, data values, or both stored in a registry associated with a set of candidate interrupt signals.

In some aspects, the electronic circuitry: configures a registry associated with a set of candidate interrupt signals. In some aspects, the registry includes a set of local interrupt configurations including at least one of a source requestor identifier, a source PASID, a source system bus, address information, and data values corresponding to the set of candidate interrupt signals; the set of local interrupt configurations includes a local interrupt configuration based on which a second local interrupt is generated at the remote destination; and the set of candidate interrupt signals include the second interrupt signal.

In some aspects, the electronic circuitry: configures a registry associated with a set of candidate interrupt signals.

In some aspects, the registry indicates at least one of an MSI-X emulation protocol type; a network device selection; a network protocol selection; a network QP selection; an XRC number selection; and a destination network address selection.

In some aspects, the electronic circuitry generates an indication of a protocol corresponding to the second interrupt signal.

A system including: a system bus; a system bus driver that is configured to enable functionality of the system bus; and electronic circuitry coupled with the system bus driver. In some aspects, the electronic circuitry: receives a remotely-generated interrupt signal over a network protocol; and generates a local interrupt based on the interrupt signal and a local interrupt configuration provided by the system bus driver.

In some aspects, the electronic circuitry: receives remotely-generated data over the network protocol; injects the data over the system bus; and injects the local interrupt over the system bus, where injecting the data and injecting the local interrupt include ensuring the data is made available to the system bus driver, prior to the interrupt handler receiving the local interrupt.

In some aspects, the electronic circuitry: establishes a bridge connection between the apparatus and a remote destination; and receives a tunneled communication from the remote destination, over the bridge connection, where the tunneled communication includes the interrupt signal, the data, or both.

In some aspects, the electronic circuitry: identifies, from a set of interrupt handlers of a first emulated device, an interrupt handler corresponding to a sender of the interrupt signal; and processes the remotely-generated interrupt signal at the interrupt handler, where processing the remotely-generated interrupt signal at the interrupt handler includes at least one of: the generating of the local interrupt; and the injecting of the local interrupt over the system bus.

A method including: receiving a remotely-generated interrupt signal from a remote destination over a network protocol; accessing a local system bus driver to obtain a local interrupt configuration; and generating a local interrupt based on the remotely-generated interrupt signal and the local interrupt configuration.

A method including: receiving a locally-generated interrupt signal from a device over a system bus; generating an interrupt signal based on the locally-generated interrupt signal; and transmitting the interrupt signal to a remote destination over a network protocol.

DETAILED DESCRIPTION

Figure 1:
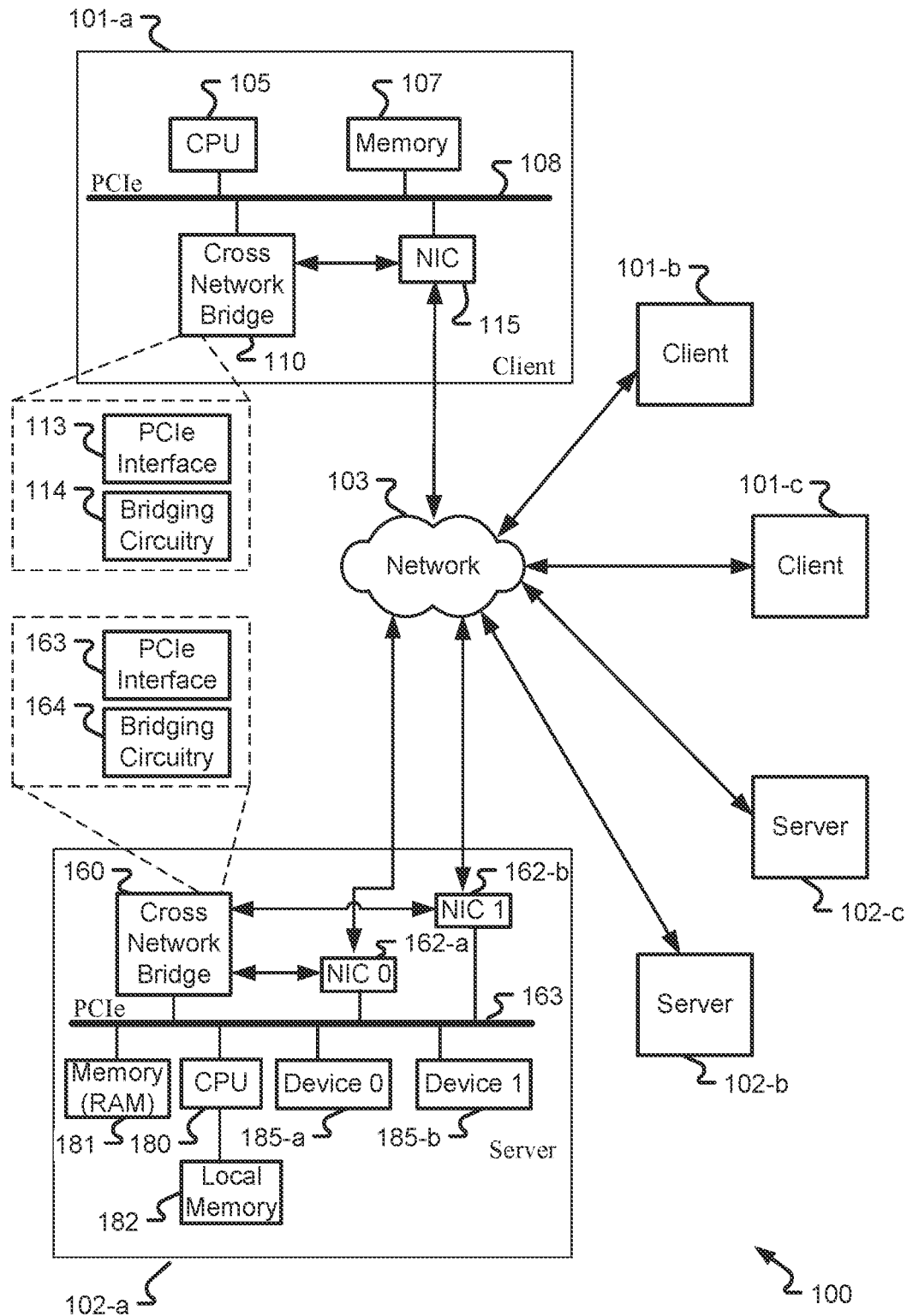
FIG. 1 illustrates example of system that supports MSI-X emulation on a network-tunneled PCIe device in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

In the descriptions herein, the term "server" may refer to a computing device dedicated to run services to serve the needs of other computing devices. The term "client" may refer to a computer hardware device or software that accesses, over a communications network, a service made available by a server. Although example implementations described herein refer to servers and clients that comprise peripheral component interconnect express (PCIe) system buses, aspects of the present disclosure support other system busses including, for example, PCI, compute express link (CXL), or Nvlink.

Some systems may support a disaggregated architecture in which functional blocks (also referred to as bricks) such as compute, memory and peripheral are spread through the system and interconnected via high speed networks. For example, some cloud providers may support device disaggregation for flexible allocation of a CPU on a compute server to allocate a device (e.g., SSD, GPU, etc.) from a remote pool of devices. In some cases, such device disaggregation and allocation may prevent or mitigate instances of "resource stranding" in which devices (e.g., GPUs) at a compute server are underutilized. In an example case, a server may have two (2) GPUs, and a customer (e.g., at a client device) may request one (1) of the GPUs for processing a compute-intensive workload (e.g., artificial intelligence, deep learning, data science, etc.). Device disaggregation may prevent wasting or non-utilization of the remaining GPU.

Some techniques for device disaggregation may include implementing tunneling PCIe connectivity between a host device (client side) and remote devices (server side) over a network. In some cases, the tunneled communications may be implemented using a bridge connection (also referred to herein a cross-network bridge (CNB)) established between the host device and the remote devices over the network. A CNB supports monitoring of TLPs over a PCIe bus, determining if the TLPs are destined for a remote client, and if so, sending a corresponding message over the network to the destined remote client. Accordingly, for example, a CNB includes a functionality supportive of PCIe tunneling.

In some cases, tunneled PCIe communications using a CNB may be associated with relatively long delays due to network unpredictability (e.g., network events), and some servers may be unable to successfully support tunneled PCIe communications due to low tolerance (at the server side) to timeouts associated with read transactions or backpressure (e.g., storage and memory overuse) associated with outstanding write transactions. Some techniques address such PCIe tunneling issues by implementing device emulation at the host device (e.g., host CPU device), while retaining PCIe tunneling on at the server side.

In some examples, a remote device at the server side may initiate and communicate PCIe transactions such as a message signaled interrupt (MSI)-X to a host device (e.g., a host CPU device at a client side). However, per PCIe specifications, an MSI-X transmitted by a remote device (server side) cannot be immediately passed to the host device for the network. For example, the MSI-X may need to comply with table configurations implemented at the CPU at the host device. In an example, the CPU may include a vector table (also referred to herein as an interrupt table, an MSI-X table, etc.) including address vectors corresponding to each MSI-X. When an MSI-X is received at the CPU, the CPU (e.g., a system bus driver of the CPU, a PCIe driver of the CPU, etc.), may identify a vector corresponding to the MSI-X. The CPU may further identify an address (pointed to by the vector) of an interrupt register used for receiving the interrupt and indirectly initiating the interrupt handling routine.

Example aspects of the present disclosure may include remote MSI-X emulation techniques that support enabling MSI-X tunneling on a host device (client side) exposed by a bridge connection (e.g., a CNB). In some aspects, the remote MSI-X techniques described herein may overcome timeout and backpressure sensitivities (e.g., at the server side) associated with full two-sided bridging (e.g., at the server side and client side). In some cases, the remote MSI-X techniques described herein may provide improvements over some RDMA based techniques for MSI-X which use Extended Reliable Connected (XRC), as such RDMA based solutions may be impacted by network inefficiencies when a device issues relatively small transactions.

Aspects of the disclosure are further illustrated by and described with reference to apparatus diagrams, system diagrams, and flowcharts that relate to MSI-X emulation on a network-tunneled PCIe device.

FIG. 1 illustrates an example of system 100 that supports MSI-X emulation on a network-tunneled PCIe device in accordance with aspects of the present disclosure. In an example, the system 100 may include client devices 101 (e.g., client device 101-*a* through client device 101-*c*) and servers 102 (e.g., server 102-*a* through server 102-*c*). The client devices 101 and servers 102 may be any electronic devices capable of connecting to a wireless or wired network.

Example aspects of the system 100 (e.g., client devices 101, servers 102, client-server communication modes, corresponding protocols, etc.) are described at U.S. Non-provisional application Ser. No. 17/013,677, incorporated herein by reference.

The system 100 may support the communication of data packets and/or network packets between the client devices 101 and servers 102, for example, via the communications network 103. For example, the communications network 103 may facilitate machine-to-machine communications between any of a client device 101 (or multiple client devices 101), the server 102 (or multiple servers 102) servers 102, and/or one or more databases (not illustrated). In some cases, the system 100 may include any number of client devices 101 and/or servers 102, and each of the client devices 101 and/or servers 102 may be associated with a respective entity.

The system 100 may support multiple client-server communication modes between the client devices 101 and the servers 102. For example, the system 100 may support tunneling protocols such as a full tunneling SEND protocol, a full tunneling mixed protocol, a single-end tunneling RDMA protocol, a single-end tunneling SEND protocol, and a hybrid protocol.

The communications network 103 may include any type of known communication medium or collection of communication media and may use any type of protocols to transport messages, signals, and/or data between endpoints. In some aspects, the communication network 120 may include wired communications technologies, wireless communications technologies, or any combination thereof.

The Internet is an example of a network (e.g., communications network 103) supported by the system 100, and the network may constitute an Internet Protocol (IP) network consisting of multiple computers, computing networks, and other devices (e.g., client devices 101, servers 102, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, Ethernet, InfiniBand™, a cellular network, and any other type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data).

A client device 101 (e.g., client device 101-a) may include a CPU 105, a memory 107, a CNB 110 (also referred to herein as a bridge connection), and a NIC 115. The CPU 105, the memory 107, the CNB 110, and the NIC 115 may be interconnected by a system bus 108 (e.g., PCI, PCIe, Nvlink, CXL, etc.) of the client device 101. In some aspects, when communicating with servers 102, the CPU 105 may communicate data with (e.g., transmit data to, received data from) a device 185 (e.g., device 185-a) included in an server 102 (e.g., server 102-a), using transaction layer packets (TLPs).

In an example, the CNB 110 may intercept a TLP from transmitted by the CPU 105. The CNB 110 may convert (e.g., translate) the TLP to a network packet (communication packet) using, for example, a tunneling protocol (e.g., full RDMA protocol, the secure neighbor discovery (SEND) part of an RDMA protocol, etc.), transparent to the CPU 105. Through the NIC 115, the CNB 110 may transmit the network packet to the server 102 over the communications network 103. The conversion (translation) between network packets and TLPs may be referred to as tunneling.

In some other aspects, the CNB 110 may receive data and/or packets (e.g., network packets, data packets) destined for (e.g., based on an associated address) the memory 107. For example, the CNB 110 may receive the data and/or packets from a device 185 (e.g., device 185-a) included in an server 102. The CNB 110 may convert data included in a packet to a TLP(s). In an example, the CNB 110 may directly write the data to the memory 107.

The CNB 110 may connect to the system bus 108 via a bus interface (e.g., PCIe interface 113) included in the CNB 110. The CNB 110 may include bridging circuitry 114 configured to perform various functions of the CNB 110 described herein. In some alternative or additional aspects, the CNB 110 may include an additional interface supportive of direct communication with the NIC 115. With reference to the following descriptions, actions described as being performed by the CNB 110 may be performed by the bridging circuitry 114, and discussion of the bridging circuitry 114 may be omitted for brevity.

In some cases, the system 100 may support client devices 101 that do not include a CNB 110. In an example, such client devices 101 may communicate with and/or access devices 185 in a server 102 using techniques such as RDMA.

A server 102 (e.g., server 102-a) may include a CNB 160, multiple NICs 162 (e.g., NIC 162-a, NIC 162-b), a CPU 180, a memory 181 (e.g., RAM), a local memory 182 (e.g., storing instructions and/or data local to the CPU 180), and devices 185 (e.g., device 185-a, device 185-b). The CNB 160, the CPU 180, the memory 181, the NICs 162, and the devices 185 may be interconnected by a system bus 163 (e.g., PCIe, PCI, Nvlink, CXL, etc.) of the server 102. In some aspects, the system bus 163 may include or be any high-speed system bus.

In some aspects, the server 102 may provide devices (e.g., a client device 101) connected to the communications network 103 with access to a device 185. For example, via the server 102, the client device 101 may communicate (e.g., transmit and/or receive data) with a device 185.

A device 185 may be, for example, a Solid-State Disk (SSD), a Graphics Processing Unit (GPU), a Field Programmable Gate Arrays (FPGA), or deep-learning inference engine. According to example aspects of the present disclosure, circuitry and suitable software implemented at the server 102 may disaggregate the device 185 and expose the device 185 to client devices 101.

In some aspects, the CPU 180 may transverse (e.g., transmit, receive) communication packets over communications network 103, for example, via the system bus 163 and a NIC 162 (e.g., NIC 162-a, NIC 162-b). Additionally, or alternatively, the CPU 180 may transverse (e.g., transmit, receive) communication packets using network adapters (e.g., InfiniBand™ Host Channel Adapter (HCA)) different from a NIC 162 (e.g., NIC 162-a, NIC 162-b).

The CNB 160 and NICs 162 may include example aspects of the CNB 110 and NIC 115. In an example, the CNB 160 may connect to the system bus 163 via a bus interface (e.g., PCIe interface 163) included in the CNB 160. The CNB 110 may include bridging circuitry 164 configured to perform various functions of the CNB 160 described herein. In some alternative or additional aspects, the CNB 160 may include an additional interface supportive of direct communication with the NICs 162. The CNB 160 may translate between PCIe TLPs and corresponding network packets, transparent to CPU 180. In some cases, each TLP may include one or more PCIe transactions over the system bus 163.

In another aspect, the CNB 160 may intercept a TLP transmitted by the CPU 180. The CNB 160 may convert the TLP to a network packet using a tunneling protocol (e.g., full RDMA protocol, the SEND part of an RDMA protocol, etc., aspects of which are described herein), transparent to the CPU 180. Via an NIC 162 (e.g., NIC 162-*a*, NIC 162-*b*), the CNB 160 may transmit the network packet to a client device 101 over the communications network 103.

In an example, the server 102 may receive (e.g., from a client device 101) a packet that is destined for a device 185 (e.g., device 185-*a*, device 185-*b*), directly or through memory 181. For example, the server 102 may receive the packet at a NIC 162, and the NIC 162 may transfer the packet to the CNB 160. Based on the packet, the CNB 160 may generate a corresponding PCIe TLP that writes data to the device 185 and/or the memory 181.

Accordingly, for example, the system 100 supports devices 185 that are disaggregated and exposed to client devices 101. Remote clients (e.g., devices 185 that are remote to client devices 101) may communicate with client devices 101, transparent to the CPU 180 (e.g., using TLPs). In an example, client devices 101 may connect to (e.g., communicate with) device 185-*a* and/or device 185-*b* over the communications network 103. In an example described with reference to FIG. 1, device 185-*a* and device 185-*b* may be electrically coupled to the server 102-*a* (e.g., via system bus 163). Additionally, or alternatively, device 185-*a* and device 185-*b* may be associated with different respective servers 102.

According to example aspects of the present disclosure, the device 185-*a* and device 185-*b* may each be divided into a set of virtual functions (VFs) (not illustrated) which are concurrently mapped to requesting entities (e.g., Virtual Machines (VMs)) in the client devices 101. In an example, client device 101-*a* may be divided among a first VF and a second VF of the device 185-*a*. In another example, client device 101-*b* may be divided among a third VF of the device 185-*a*, a first VF of the device 185-*b*, and a second VF of the device 185-*b*. In some aspects, the VFs of a device 185 may be identified by addresses that a client device 101 (e.g., a CPU 105 of the client device 101) specifies when accessing the device 185. Additionally, or alternatively, the VFs may be identified by an identifier (e.g., Requestor-ID, a PCIe's process address space identifier (PASID), etc.) that the VF adds to a network transmission, in device-to-client TLPs.

From the perspective of a server 102 (e.g., server 102-*a*), different client devices 101 served by the same device 185 may be distinguished based on a unique requestor-ID or a PCIe's PASID. Additionally, or alternatively, if the server 102 comprises an input-output memory management unit (IOMMU), different client devices 101 served by the same device 185 may be distinguished based on address-range. In some aspects, a requestor-ID may be tunneled (e.g., with CNB intervention described herein). Additionally, or alternatively, a requestor-ID may be communicated without tunneling (e.g., handled by local CPUs, with no CNB intervention).

In some aspects, the NIC 115 and NICs 162 described herein may be a Smart NIC (also referred to herein as an intelligent server adapter (ISA), data processing unit (DPU), or Smart NIC) capable of supporting accelerated networking functions. In an example, a Smart NIC may support performance boosting through network data path processing. In some aspects, a Smart NIC (or DPU) may be a system on chip (SOC) device that combines a high-performance and software-programmable multi-core CPU, a high-performance network interface, and flexible and programmable acceleration engines. A DPU, for example, is a high-performance network interface capable of parsing, processing and efficiently transferring data at line rate, or the speed of the rest of a network (e.g., communications network 103), to GPUs and CPUs.

In another aspect, the NIC 115 and NICs 162 may be Smart NICs that include a DPU(s). In some other aspects, the NIC 115 and NICs 162 may be DPUs usable as standalone embedded processors. In some cases, an NIC described herein (e.g., NIC 115, NIC 162) may be an emulated device. For example, an NIC 115 of a client device 101 (e.g., client device 101-*a*) may be provided by emulation logic/circuitry (later illustrated with reference to FIG. 2) included in the client device 101.

Aspects of the present disclosure may support other example configurations of client devices 101 and/or servers 102. For example, In some aspects, the CPUs described herein (e.g., CPU 105, CPU 180) may be implemented by multiple CPUs, the system bus 108 and/or the system bus 163 may be implemented by any high-speed bus or combination of high-speed buses, local memory 182 may be omitted, memory 107 may be omitted, and/or memory 181 may be omitted. In some example implementations, any of the client devices 101 and/or servers 102 may include a hierarchy of local memories and/or other memory (e.g., RAM).

In some aspects, some servers 102 may function as both a server and a client. In some other aspects, some client devices 101 may access a server 102 through network elements other than those illustrated and described herein. In some cases, some client devices 101 and/or servers 102 may be implemented by an aggregation of coupled computing devices.

According to example aspects of the present disclosure, the system 100 may support aspects of MSI-X emulation on network-tunneled PCIe device in the communications network 103. For example, the system 100 may support techniques for MSI-X tunneling on a host device (e.g., a client device 101) exposed by a bridge connection such as a CNB (e.g., CNB 110, CNB 160).

While the illustrative aspects, examples, and/or configurations illustrated herein show the various components of the system 100 collocated, certain components of the system 100 can be located remotely, at distant portions of a distributed network, such as a Local Area Network (LAN) and/or the Internet, or within a dedicated system. Thus, it should be appreciated, that the components of the system 100 can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Figure 2:
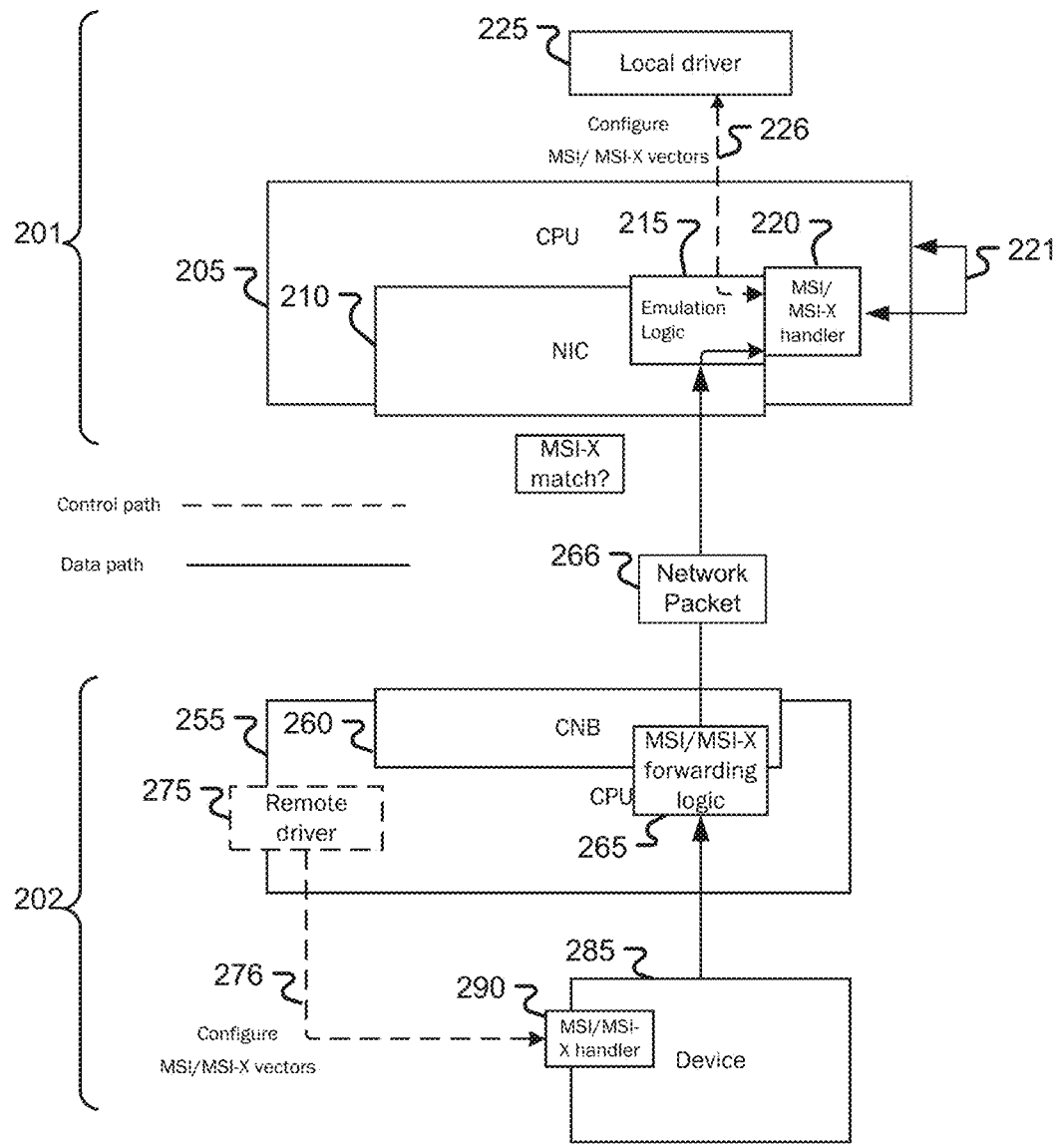
FIG. 2 illustrates example of system that supports MSI-X emulation on a network-tunneled PCIe device in accordance with aspects of the present disclosure.

FIG. 2 illustrates an example of a system 200 that supports MSI-X emulation on a network-tunneled PCIe device in accordance with aspects of the present disclosure. For example, the system 200 may support PCIe tunneling.

The system 200 may include a client device 201 and a server 202. The client device 201 may include examples of aspects of a client device 101 described with reference to FIG. 1. The server 202 may include examples of aspects of a server 102 described with reference to FIG. 1. The system

200 may support the communication of data packets between the client devices 201 and the server 202, for example, via communications network (e.g., a communications network 103 described with reference to FIG. 1). The system 200 may support the communication of interrupt signals and/or data via tunneled communications, using an established bridge connection (e.g., a CNB).

The client device 201 may include a CPU 205, a NIC 210, emulation logic 215 (also referred to herein as emulation logic circuitry), an MSI/MSI-X handler 220, and a local driver 225 (e.g., a system bus driver local to the CPU 205 (also referred to herein as a client-side system bus driver), a PCIe driver local to the CPU 205 (also referred to herein as a client-side PCIe driver), etc.). CPU 205, NIC 210, emulation logic 215, MSI/MSI-X handler 220, and local driver 225 may include aspects of like elements described herein.

The server 202 may include a CPU 255, a CNB 260, MSI/MSI-X forwarding logic 265, a device 285, and an MSI/MSI-X handler 290. In some optional implementations, the server 202 may include a remote driver 275. CPU 255, CNB 260, MSI/MSI-X forwarding logic 265, remote driver 275 (e.g., a PCIe driver remote from CPU 205), device 285, and MSI/MSI-X handler 290 may include aspects of like elements described herein. In some aspects, the CNB 260 may be implemented as hardware or software.

According to example aspects of the present disclosure (examples of which are later illustrated and described at least with reference to FIGS. 3 through 5), a client device 201 may support receiving incoming data and/or network packets 266 from a device 285 over NIC 210. In some examples, the client device 201 may receive a tunneled communication (e.g., including the data and/or an interrupt signal) over NIC 210. In some aspects, the data is received as part of the network packet 266.

In some aspects, the NIC 210 may include emulation logic 215, and the client device 101 may receive data at an emulated device (e.g., a DPU) implemented at emulation logic 215. For example, the client device 101 may receive network packets 266 (inclusive of the data) at the emulated device. In some aspects, the client device 101 may receive an interrupt signal (e.g., MSI-X) at the emulated device. In some examples, the NIC 210 may receive tunneled communications (e.g., including data and/or an interrupt signal) at the emulated device. In some optional implementations, the NIC 210 may support communications over an established bridge connection (e.g., the NIC 210 may include a CNB).

Local driver 225 may configure and/or maintain an MSI-X table (not illustrated) of candidate MSI-X signals. The MSI-X signals may be routable/receivable at the local driver 225. In some aspects, the MSI-X signals may be referred to as vectors, MSI vectors, or memory writes. The MSI-X table may be referred to herein as a vector table. In an example, the local driver 225 may configure the MSI-X table per PCIe specifications, such that the MSI-X table includes address information (also referred to herein address vectors, destinations, etc.), data values, and masking information corresponding to the candidate MSI-X signals. The masking information may include an indication of respective masking states (e.g., masked, unmasked) of the MSI-X signals.

In some aspects, the MSI-X table is used to convert the network MSI-X indication into a write TLP sent on the local system bus to the CPU 205. The write TLP may include address information and/or data which is meaningful to the interrupt controllers (also referred to herein as MSI/MSI-X handlers) on the CPU 205. In some aspects, the system 200 may support matching of inbound network transactions by a separate registry (e.g., a match register, etc.) programmed by the CPU 205, a DPU, etc.

In an example, the local driver 225 may configure the MSI and/or MSI-X signals (vectors) for the MSI-X table. The local driver 225 may provide control signals (e.g., over a control path 226) indicative of the MSI-X table, MSI signals (vectors), and/or MSI-X signals (vectors), to the NIC 210 (e.g., emulation logic 215). The local driver 225 may receive MSI-X signals from the device 285, for example, via MSI/MSI-X forwarding logic 265 and an MSI/MSI-X handler(s) 220. The MSI-X signals may correspond to the candidate MSI-X signals included in the MSI-X table. In some aspects, all configurations (e.g., configurations of MSI/MSI-X vectors as maintained in the MSI-X table) received at the emulated device (e.g., included in emulation logic 215) may be intercepted by MSI-X handler(s) 220. The MSI-X handler(s) 220 may be included in and implemented by at least a portion of the emulation logic 215.

In an example, the emulated device may receive an incoming network packet 266 (e.g., a TLP, such as an inbound PCIe write) from device 285 (and/or an emulated PCIe device at the server 202). The emulated device (e.g., with assistance from an MSI/MSI-X handler(s) 220), may use the MSI-X matching registers to identify whether the incoming network packet 266 is an MSI-X. For example, the emulated device may compare address information and/or data (data fields) indicated in network packet 266 to address information and/or data (data fields) of MSI-Xs included in the MSI-X matching register. If the emulated device identifies, within the MSI-X matching register, an MSI-X associated with address information and/or data that matches the address information and/or data indicated in the network packet 266, the emulated device may detect the network packet 266 as an MSI-X (e.g., the MSI-X identified in the MSI-X matching registers).

Additionally, or alternatively, the emulated device may detect the network packet 266 (e.g., TLP, inbound PCI-e write) as an MSI-X based on an explicit protocol indication appended to the network packet 266 (e.g., an explicit MSI-X indication added by the TLP tunneling protocol).

In an example, if the NIC 210 detects a network packet 266 as an MSI-X, the NIC 210 may trigger a corresponding MSI/MSI-X handler (e.g., MSI-X handler 220). For example, the NIC 210 may identify, from the MSI-X matching register, that the MSI/MSI-X handler 220 corresponds to a logical action (e.g., logic interrupt, etc.) indicated by the network packet 266. In another example, the NIC 210 may identify, from the MSI-X table, that address information and/or data associated with the MSI/MSI-X handler 220 (e.g., as stored in the MSI-X matching register) corresponds to address information and/or data indicated by the network packet 266. Accordingly, for example, the NIC 210 may identify and/or trigger the MSI/MSI-X handler 220 based on a logical action, address information, and/or data indicated by the network packet 266. For example, the network packet 266 may be packetized data inclusive of the logical action packetized with the address information and data.

An MSI-X may support per function masking and per vector masking. According to example aspects of the present disclosure, the MSI-X handler 220 may issue (e.g., reissue) an identified MSI-X based on whether the MSI-X is masked or unmasked. For example, the MSI-X handler 220 may generate a local interrupt based on the MSI-X. In some examples, the using the MSI-X handler 220 and the MSI-X table, the NIC 210 may identify whether an MSI-X associated with a network packet 266 (e.g., based on the logical action, address information, and/or data indicated by the network packet 266) is a masked MSI-X or an unmasked MSI-X.

For example, the system bus (e.g., PCIe bus) of the client device 201 may support a mask bits field for indicating whether an interrupt request (e.g., MSI-X) is masked. In an example, a logic bit value of '0' may indicate that an interrupt request is unmasked, and a logic bit value of '1' may indicate that an interrupt request is masked.

If the NIC 210 identifies that an MSI-X is unmasked (e.g., logic bit value in a mask bits field is '0'), the MSI-X handler 220 may issue (e.g., reissue) the MSI-X according to a local interrupt configuration at the CPU 205 (e.g., a CPU-side configuration provided by the local driver 225. Accordingly, for example, the MSI-X is issued to the MSI-X handler 220 (e.g., interrupt controller), forwarded to the CPU 205, and handled by the local driver 225.

Example aspects of issuing (e.g., reissuing) the MSI-X may include generating a local interrupt based on the MSI-X and/or the local interrupt configuration (e.g., in an MSI-X table). Example aspects of issuing (e.g., reissuing) the MSI-X may include injecting the local interrupt over the system bus (e.g., PCIe bus) of the client device 201. Injecting the local interrupt may include transmitting the local interrupt to the CPU 205.

Additionally, or alternatively, if the NIC 210 identifies that the MSI-X is masked (e.g., logic bit value in a Mask Bits field is '1'), the MSI-X handler 220 may refrain from issuing (e.g., reissuing) the MSI-X, and the MSI/MSI-X handler 220 may refrain from providing the same to the local driver 225. For example, the MSI-X handler 220 may refrain from generating a local interrupt and/or injecting the local interrupt over the system bus. For example, the NIC 210 may maintain the logic bit value (i.e., pending bit value) as set, as per PCIe specifications.

In some aspects, the MSI-X handler 220 may verify that all prior posted transactions are ordered (e.g., the ordering of data-write commands received at the NIC 210 is completed), before an MSI-X is written. For example, the MSI/MSI-X handler 220 may verify that all prior posted transactions are ordered, prior to issuing (e.g., reissuing) a detected MSI-X and/or providing the issued MSI-X to the local driver 225. In some aspects, by first verifying that all prior posted transactions are ordered, the MSI-X handler 220 may ensure that a written MSI-X does not bypass previous data the MSI-X is signaling. In some aspects, verifying that all prior posted transactions are ordered may be referred to as 'fencing' prior outstanding data-write commands.

Some alternative aspects of the present disclosure are later described (e.g., with reference to FIG. 7) in which an MSI-X table (not illustrated) configured and/or maintained at the server 202 is implemented for MSI-X handling between the server 202 and a client device 201.

Figure 3:
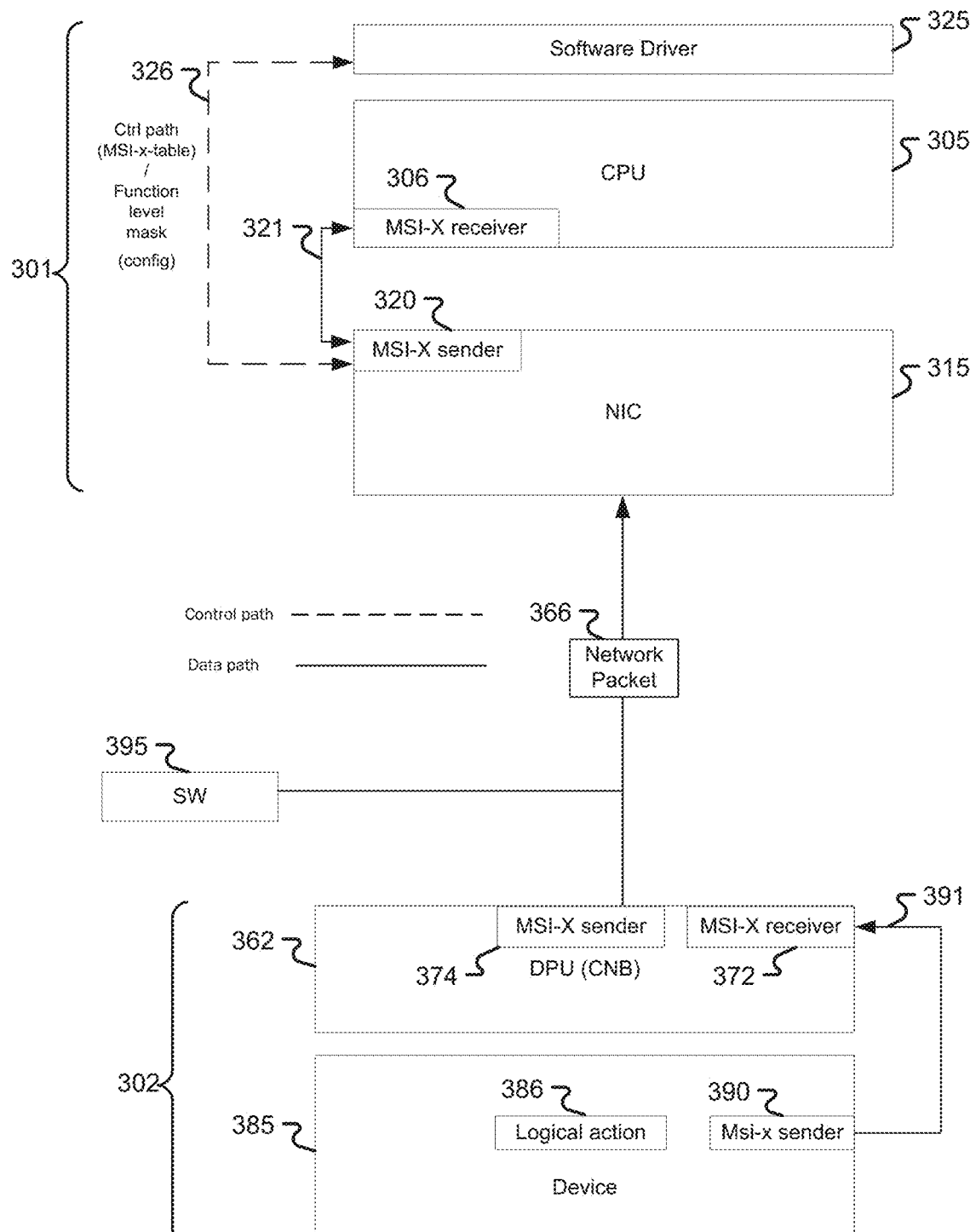
FIG. 3 illustrates an example of a system that supports nested MSI-X handling in accordance with aspects of the present disclosure.

FIG. 3 illustrates an example of a system 300 that supports nested MSI-X handling in accordance with aspects of the present disclosure.

The system 300 may include a client device 301 and a server 302. The client device 301 may include examples of aspects of a client device 101 described with reference to FIG. 1. The server 302 may include examples of aspects of a server 102 described with reference to FIG. 1. The system 300 may support the communication of data packets between the client devices 301 and the server 302, for example, via communications network (e.g., a communications network 103 described with reference to FIG. 1). The system 300 may support the communication of interrupt signals and/or data via tunneled communications, using an established bridge connection (e.g., a CNB).

The client device 301 may include a CPU 305, a NIC 315, and software driver 325. The NIC 315 may be part of a DPU. The NIC 315 may include aspects of a NIC 115 described with reference to FIG. 1. In some aspects, the NIC 315 may comprise an emulated device. For example, the NIC 315 may implement emulation logic 215 described with reference to FIG. 2. In some optional implementations, the NIC 315 may include comprise a CNB (e.g., CNB 110 described with reference to FIG. 1). Software driver 325 may be an example of a local driver 225 (e.g., a PCIe driver local to the CPU 305) described with reference to FIG. 2.

The server 302 may include a DPU 362 and a device 385. The DPU 362 may include aspects of a NIC 162 described with reference to FIG. 1. For example, the DPU 362 may be implemented in association with a bridge connection such as a CNB (e.g., CNB 160 or CNB 260 described with reference to FIGS. 1 and 2). The device 385 may be an example of a device 185 or a device 285 described with reference to FIGS. 1 and 2. For example, the device 385 may be a PCIe device. In some examples, the device 385 may be an emulated device (e.g., provided by emulation logic/circuitry at the server 302). In some alternative and/or additional implementations, the server 302 may support an emulated device (e.g., software implementation 395) supportive of features of DPU 362 and/or device 385.

Client device 301 may support receiving, at NIC 315, incoming network packets 366 (e.g., a TLP, an MSI-X) from device 385. Software driver 325 may configure and/or maintain an MSI-X table (e.g., address-data masking, memory space, etc.) (not illustrated) of candidate MSI-X signals described herein. In an example, the software driver 325 provide control signals (e.g., over a control path 326) indicative of the MSI-X table, corresponding MSI signals (vectors), and/or corresponding MSI-X signals (vectors), to an MSI-X sender 320. The MSI-X receiver 306 may receive MSI-X signals (e.g., an MSI-X interrupt) from the MSI-X sender 320, for example, via data path 321.

In an example, for a logical action 386 (e.g., logic interrupt, etc.), the device 385 may provide (e.g., via MSI-X sender 390) an MSI-X to DPU 362. The DPU 362 may receive the MSI-X at an MSI-X receiver 372. The DPU 362 may transmit the MSI-X to the client device 101 via an MSI-X sender 374 of the DPU 362. In an example, the DPU 362 may transmit a network packet 366 (e.g., including the MSI-X) to the client device 101 via an MSI-X sender 374 of the DPU 362.

MSI-X receiver 372 and the MSI-X sender 374 may include aspects of MSI/MSI-X forwarding logic 265 described with reference to FIG. 2. In an example, the DPU 362 (via the MSI-X sender 374) may transmit network packet 366 (e.g., including the MSI-X) over a communications network (e.g., communications network 103 described with reference to FIG. 1) according to a network protocol described herein.

The NIC 315 may receive the MSI-X. In some aspects, the NIC 315 may receive the MSI-X in the network packet 366. If the NIC 315 detects the network packet 366 as an MSI-X (e.g., using the MSI-X matching register, based on an explicit protocol indication appended to the network packet 366, etc.), the NIC 315 may trigger a corresponding MSI/MSI-X handler. For example, the NIC 315 may identify, from the MSI-X matching register, that MSI-X sender 320 (e.g., 'MSI-X sender') corresponds to the logical action 386 indicated by the network packet 366. In another example, the NIC 315 may identify, from the MSI-X matching registers, that address information and/or data associated with the MSI-X sender 320 (e.g., as stored in the MSI-X table) corresponds to address information and/or data of an interrupt (e.g., an MSI-X) indicated by the network packet 366.

The NIC 315 (e.g., using MSI-X sender 320) may issue (e.g., reissue) the MSI-X, based on whether the MSI-X is masked or unmasked. For example, if the NIC 315 (e.g., the MSI-X sender 320) identifies that the MSI-X is unmasked (e.g., logic bit value in a Mask Bits field is '0'), the MSI-X sender 320 may issue (e.g., reissue) the MSI-X according to a local interrupt configuration at the CPU 305.

Example aspects of issuing (e.g., reissuing) the MSI-X may include generating a local interrupt based on the MSI-X and/or the local interrupt configuration. Example aspects of issuing (e.g., reissuing) the MSI-X may include injecting the local interrupt over the system bus (e.g., PCIe bus) of the client device 301. Injecting the local interrupt may include transmitting the local interrupt to the CPU 305, which may be received by the software driver 325.

Additionally, or alternatively, if the NIC 315 identifies that the MSI-X is masked (e.g., logic bit value in a Mask Bits field is '1'), the MSI-X sender 320 may refrain from issuing (e.g., reissuing) the MSI-X, and the MSI-X sender 320 may refrain from providing the same to software driver 325.

In an example, for an unmasked MSI-X, the MSI-X sender 320 may provide (e.g., issue, reissue) the MSI-X to the software driver 325, and the software driver 325 may handle the MSI-X. In some aspects, the CPU 305 may affiliate the MSI-X with corresponding data. For example, CPU 305 providing the MSI-X to the software driver 325 may include calling a corresponding interrupt service route and serving the interrupt. MSI-X receiver 306 and MSI-X sender 320 may include aspects of MSI/MSI-X handler 220 described with reference to FIG. 2.

As described with reference to FIG. 3, a data path 321 supports communications between the CPU 305 and the NIC 315 in association with interrupts (e.g., MSI vectors, MSI-X vectors, etc.) described herein. The control path 326 supports communications between the software driver 325 and the NIC 315 in association with control signals indicative of an MSI-X table and function level masking (e.g., configurations). Similar aspects (e.g., data paths, control paths, etc.) have been/are to be illustrated and described with reference to FIGS. 2, 4, 6, and 8.

Aspects of the present disclosure support improved communication associated with MSI-X delivery compared to some other data packet networks, as some other data packet networks deliver MSI-X writes through direct communication between a remote NIC (e.g., DPU 362) and an MSI-X receiver (e.g., MSI-X receiver 306) of a client-side CPU (e.g., CPU 305).

Figure 4:
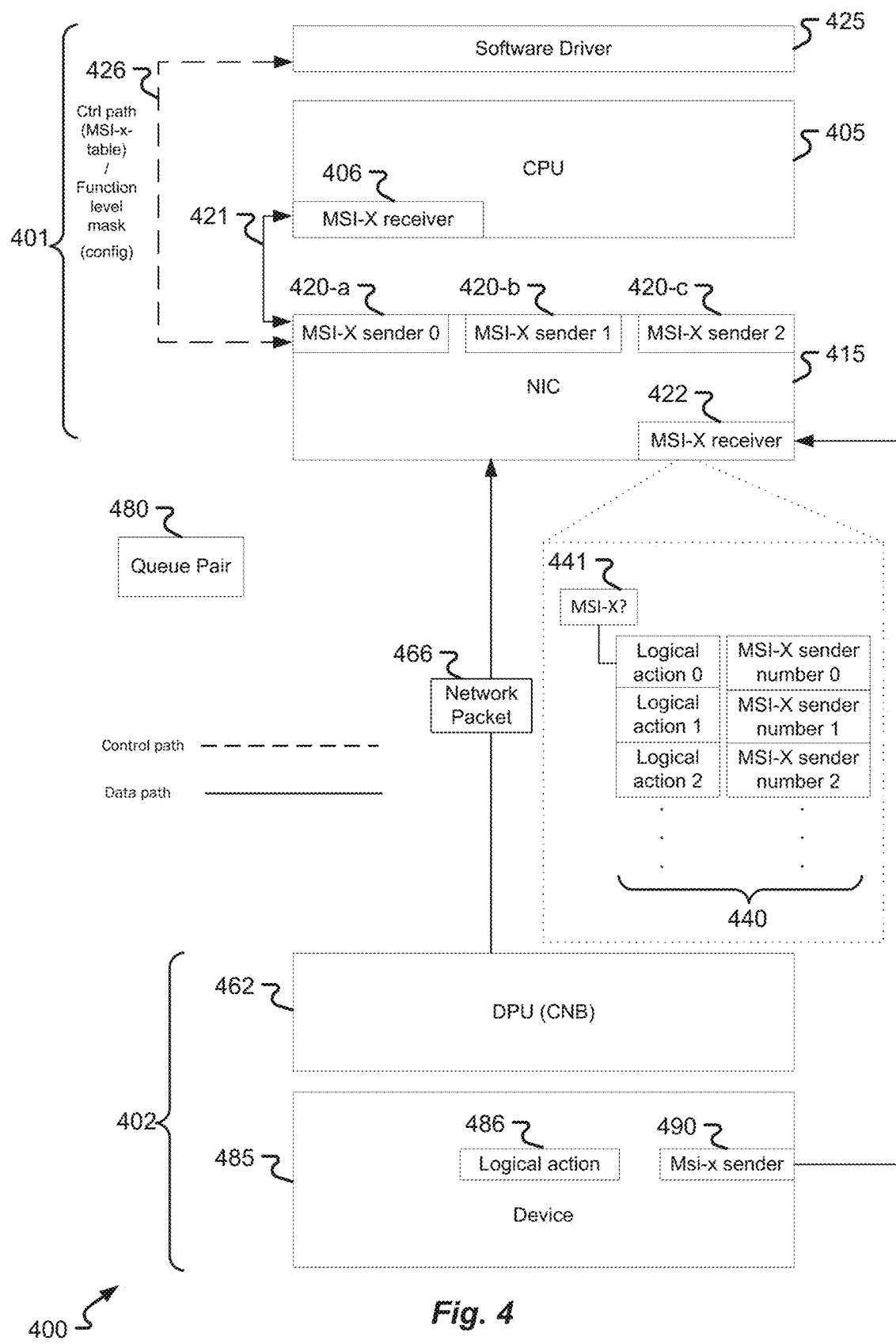
FIG. 4 illustrates an example of a system that supports nested MSI-X handling in accordance with aspects of the present disclosure.

FIG. 4 illustrates an example of a system 400 that supports nested MSI-X handling in accordance with aspects of the present disclosure. For example, the system 400 may support a single-end tunneling SEND protocol with XRC.

The system 400 may include a client device 401 and a server 402. The client device 401 may include examples of aspects of a client device (e.g., client device 101, client device 201, client device 301, etc.) described herein. For example, the client device 401 includes a CPU 405, a NIC 415, and software driver 425, aspects of which correspond to like elements described herein. The server 402 may include examples of aspects of a server (e.g., server 102, server 202, server 302, etc.) described herein. For example, the server 402 includes a DPU 462 and a device 485, aspects of which correspond to like elements described herein. In some optional implementations, the NIC 415 may include a CNB.

The system 400 may support the communication of data packets between the client device 401 and the server 402, for example, via communications network (e.g., a communications network 103 described with reference to FIG. 1). The system 400 may support the communication of interrupt signals and/or data via tunneled communications, using an established bridge connection (e.g., a CNB).

Client device 401 may support receiving, at NIC 415, data from device 485 (e.g., via DPU 462). Client device 401 may support receiving, at NIC 415, incoming network packets 466 (e.g., a TLP, an MSI-X) including the data, from device 485 (e.g., via DPU 462). Software driver 425 may configure and/or maintain MSI-X matching registers 440 of candidate MSI-X signals described herein. In an example, the MSI-X matching registers 440 may include MSI-X signals, corresponding logical actions (e.g., logical action 0, logical action 1, etc.), and corresponding MSI-X sender numbers (e.g., MSI-X sender number 0, MSI-X sender number 1, etc.).

In an example, the software driver 425 may provide control signals (e.g., over a control path 426) indicative of the MSI-X matching registers 440 (e.g., indicative of MSI-Xs, corresponding logical actions, corresponding MSI-X sender numbers, etc.) (e.g., address-data masking, memory space, etc.) to an MSI-X sender 420 (e.g., MSI-X sender 420-*a* through MSI-X sender 420-*c*). The MSI-X receiver 406 may receive MSI-X signals (e.g., MSI-X interrupts) from an MSI-X sender 420 (e.g., MSI-X sender 420-*a* through MSI-X sender 420-*c*), for example, via data path 421.

In an example, for a logical action 486 (e.g., logic interrupt, etc.), the device 485 may provide (e.g., via MSI-X sender 490) an MSI-X to NIC 415. Although illustrated as different arrows in FIG. 4, the device 485 may transmit the MSI-X to the client device 101 in a network packet 466, via the DPU 462, over a communications network (e.g., communications network 103 described with reference to FIG. 1) according to any network protocol described herein.

The NIC 415 may receive the network packet 466 (e.g., including the MSI-X) at an MSI-X receiver 422. The NIC 415 may detect whether the network packet 466 is an MSI-X (e.g., using the MSI-X matching register 440, based on an explicit protocol indication appended to the network packet 466, etc.). If the NIC 415 detects the network packet as an MSI-X (e.g., at 441), the NIC 415 may trigger a MSI/MSI-X handler (e.g., an MSI-X sender 420) corresponding to the logical action 486 associated with the MSI-X. For example, using the MSI-X matching registers 440, the NIC 415 may map the logical action 486 to a MSI-X sender number (e.g., MSI-X sender number 0, MSI-X sender number 1, etc.).

For example, logical action 486 may be a 'logical action 0' of the MSI-X matching registers 440. The NIC 415 may identify, from the MSI-X matching registers 440, that a MSI-X sender number (e.g., 'MSI-X sender number 0') corresponding to MSI-X sender 420-*a* (e.g., 'MSI-X sender') maps to the logical action 486 (e.g., 'logical action 0'). In another example, the NIC 415 may identify, from the MSI-X matching registers 440, that address information and/or data associated with the MSI-X sender 420-*a* (e.g., as stored in the MSI-X matching registers 440) and MSI-X receiver 406 corresponds to address information and/or data indicated by the MSI-X.

The NIC 415 (e.g., MSI-X sender 420-*a*) may issue (e.g., reissue) the MSI-X or refrain from issuing (e.g., reissuing) the MSI-X, based on whether the MSI-X is masked or unmasked, aspects of which have been described herein. In an example, for an unmasked MSI-X, the MSI-X sender 420-*a* may provide (e.g., issue, reissue) the MSI-X to the software driver 425, and the software driver 425 may handle the MSI-X. For example, the software driver 425 may provide the MSI-X to the CPU 405 (e.g., via MSI-X receiver 406). In some aspects, the CPU 405 may process the MSI-X based on respective masking properties (e.g., masked, unmasked) of the MSI-X, and the CPU 405 may affiliate the MSI-x with corresponding data.

Example aspects of issuing (e.g., reissuing) the MSI-X may include generating a local interrupt based on the MSI-X and/or the local interrupt configuration. Example aspects of issuing (e.g., reissuing) the MSI-X may include injecting the local interrupt over the system bus (e.g., PCIe bus) of the client device 401. Injecting the local interrupt may include transmitting the local interrupt to the CPU 405.

Additionally, or alternatively, for a masked MSI-X, the MSI-X sender 420-*a* may refrain from issuing (e.g., reissuing) the MSI-X. For example, the NIC 415 may maintain the logic bit value (i.e., pending bit) as set, as per PCIe specifications.

Figure 5:
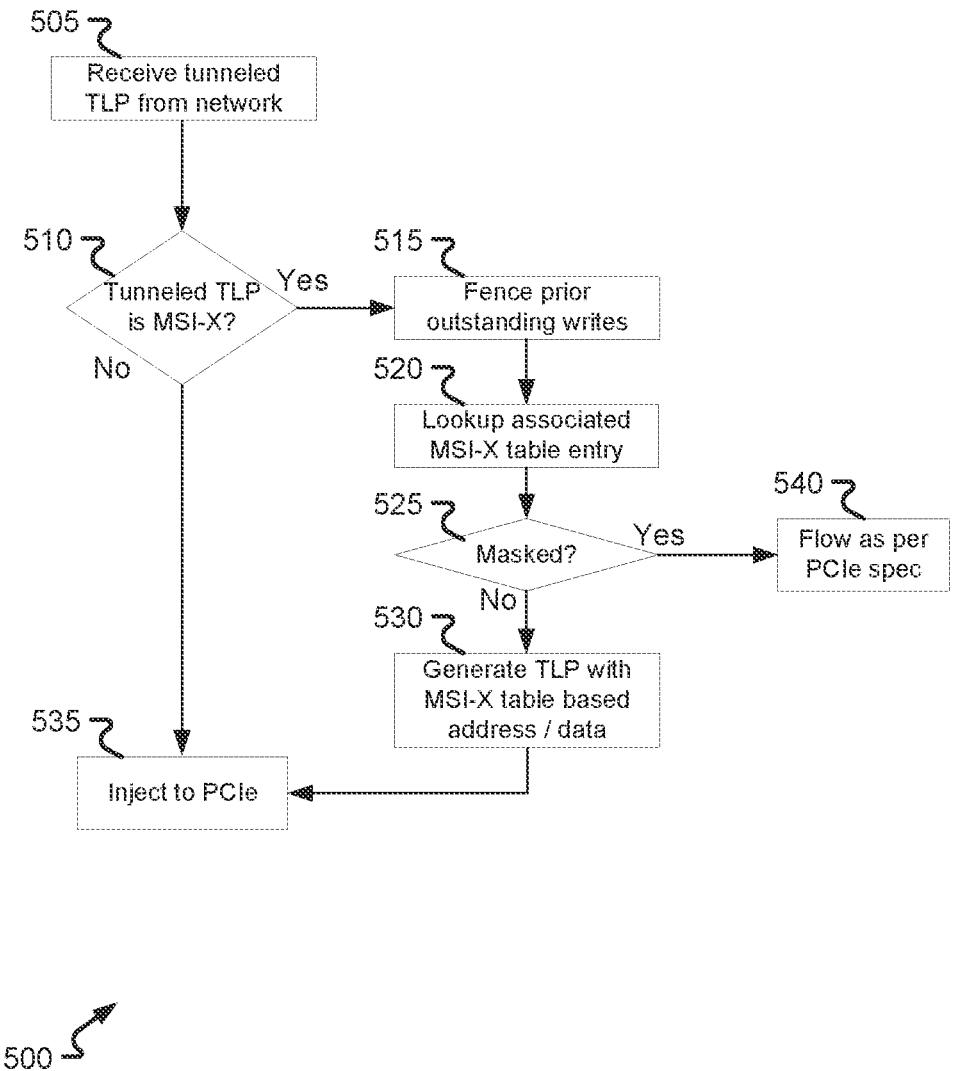
FIG. 5 illustrates an example of a process flow that supports nested MSI-X handling in accordance with aspects of the present disclosure.

FIG. 5 illustrates an example of a process flow 500 that supports nested interrupt (e.g., MSI-X, MSI, etc.) handling in accordance with aspects of the present disclosure. For example, the process flow 500 may support a single-end tunneling SEND protocol with XRC. The process flow 500 may be implemented at logic elements of a client device 401 described herein. Aspects described with respect to MSI-X handling and the process flow 500 may be applied to handling interrupts (e.g., MSI, etc.) additional and/or alternative to an MSI-X.

In the following description of the process flow 500, the operations may be performed in a different order than the order shown, or the operations may be performed in different orders or at different times. Certain operations may also be left out of the process flow 500, or other operations may be added to the process flow 500.

Process flow 500 is described with reference to the example system 400 of FIG. 4. It is to be understood that while a client device 401 is described as performing a number of the operations of process flow 500, any device (e.g., a client device 101 and/or a server 102 described with reference to FIG. 1) may perform the operations shown.

At 505, the client device 401 may receive a TLP (e.g., network packet 466) over a communications network (e.g., communications network 103 described with reference to FIG. 1). In an example, the client device 401 may receive the TLP over a single-end tunneling SEND protocol. For example, the TLP may be a tunneled TLP. In some aspects, the client device 401 may receive the TLP over an established bridge connection (e.g., CNB).

At 510, the client device 401 may detect whether the TLP is an MSI-X (e.g., using the MSI-X matching registers 440, based on an explicit protocol indication appended to the network packet 466, etc.).

If the client device 401 detects the network packet as an MSI-X, then at 515, the client device 401 may verify that all prior posted transactions are ordered. For example, the client device 401 may verify that the ordering of data-write commands (also referred to herein as 'data writes') received at the NIC 415 is completed. That is, for example, the client device 401 may 'fence' prior outstanding data-write commands.

Additionally, or alternatively, if the client device 401 detects that the TLP is not an MSI-X, then at 535, the client device 401 may inject the TLP (e.g., non MSI-X) over a system bus (e.g., PCIe bus) of the client device 401. For example, the client device 401 may provide the TLP (e.g., non MSI-X) to host memory of the client device 401.

At 520, the client device 401 may identify an MSI-X matching registers entry corresponding to the TLP (e.g., if the TLP is identified as an MSI-X). For example, using the MSI-X matching registers 440, the NIC 415 may map a logical action 486 indicated by the TLP to a MSI-X sender number (e.g., MSI-X sender number 0, MSI-X sender number 1, etc.). For example, the NIC 415 may identify that address information and/or data associated with the MSI-X sender 420-*a* (e.g., as stored in the MSI-X matching registers 440) corresponds to address information and/or data indicated by the TLP (e.g., MSI-X).

At 525, the client device 401 may identify whether the TLP is a masked MSI-X or an unmasked MSI-X (e.g., based on a mask bits field, a logic bit value, etc. described herein).

If the client device 401 identifies that the TLP is an unmasked MSI-X, then at 530, the client device 401 (e.g., NIC 415) may generate (e.g., issue, reissue) the TLP based on address information and/or data included in the MSI-X table (e.g., MSI-X address and data fields are retrieved from the MSI-X table). For example, the client device 401 (e.g., NIC 415) may generate the TLP using MSI-X sender 420-*a* identified at 520. Accordingly, for example, the client device 401 (e.g., NIC 415) may generate a local interrupt.

Additionally, or alternatively, if the client device 401 identifies that the TLP is a masked MSI-X, then at 540, the client device 401 (e.g., NIC 415) may refrain from generating (e.g., issuing, reissuing) the TLP. For example, the client device 401 (e.g., NIC 415) may refrain from generating a local interrupt. In an example, the client device 401 (e.g., NIC 415) may maintain a logic bit value in a mask bits field as set, aspects of which have been described herein.

At 535, the client device 401 may inject the TLP (e.g., MSI-X) to over the system bus (e.g., PCIe bus). For example, the client device 401 (e.g., via the NIC 415 and MSI-X sender 420-*a*) may provide the TLP (e.g., MSI-X) to the software driver 425, and the software driver 425 may handle the TLP (e.g., MSI-X). For example, the software driver 425 may provide the MSI-X to the CPU 405 (e.g., via MSI-X receiver 406). Additionally, or alternatively, the client device 401 may provide the TLP (e.g., MSI-X) to the CPU 405, and the CPU 405 may handle the TLP.

As described herein, at 535, for a TLP that is not an MSI-X, the client device 401 may inject data (e.g., a TLP that is not an MSI-X) over the system bus (e.g., PCIe bus), to the host memory. In some aspects, at 535, for a TLP that is an MSI-X, the client device 401 may inject a local interrupt over the system bus (e.g., PCIe bus), to the CPU 405 and/or the software driver 425. In an example, injecting the data and injecting the local interrupt includes ensuring the data is made available to a system bus driver of the client device 401, prior to the interrupt handler receiving the local interrupt. Accordingly, for example, injecting the data and injecting the local interrupt includes ensuring the data is visible to software driver 425 of the client device 401, before the interrupt.

Figure 6:
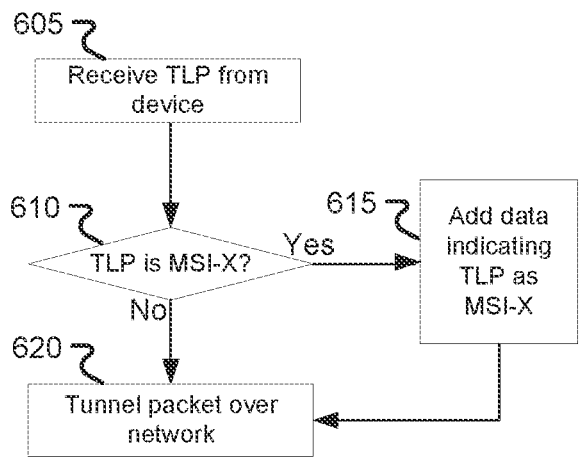
FIG. 6 illustrates an example of a process flow that supports nested MSI-X handling in accordance with aspects of the present disclosure.

FIG. 6 illustrates an example of a process flow 600 that supports nested interrupt (e.g., MSI-X, MSI, etc.) handling in accordance with aspects of the present disclosure. For example, the 600 may support a single-end tunneling SEND protocol with XRC. The process flow 600 may be implemented at logic elements of a server 402 described herein. Aspects described with respect to MSI-X handling and the process flow 600 may be applied to handling interrupts (e.g., MSI, etc.) additional and/or alternative to an MSI-X.

In the following description of the process flow 600, the operations may be performed in a different order than the order shown, or the operations may be performed in different orders or at different times. Certain operations may also be left out of the process flow 600, or other operations may be added to the process flow 600.

Process flow 600 is described with reference to the example system 400 of FIG. 4. It is to be understood that while a server 602 is described as performing a number of the operations of process flow 600, any device (e.g., a client device 101 and/or another server 102 described with reference to FIG. 1) may perform the operations shown.

At 605, the DPU 462 may receive a TLP from the device 485.

At 610, the DPU 462 may detect whether the TLP is an MSI-X. For example, the DPU 462 may detect whether the TLP is an MSI-X using the MSI-X matching registers 440 as described herein.

If the DPU 462 detects the TLP as an MSI-X, then at 615, the DPU 462 may add data, for example, metadata (e.g., an XRC number later described with reference to FIG. 7) indicating a TLP as an MSI-X. For example, the DPU 462 may use an address and data combination unique to the MSI-X compared to other MSI-Xs. In some cases, the address may be configured to be within a range which does not overlap with a direct memory access (DMA) address space of the CPU 405 (e.g., a CPU-side MSI-X address space). In some aspects, the DPU 462 may apply an explicit protocol indication to the TLP, based on which the NIC 415 may detect whether the TLP is an MSI-X (aspects of which have been described herein).

In some examples, the DPU 462 may use an explicit protocol indication or specific data values and/or address values as indicated by server side MSI-X matching registers (e.g., MSI-X matching registers 775 later illustrated at FIG. 7). Alternatively or additionally, the MSI-X TLP may be tunneled as-is, without any modifications to the contents (e.g., data) thereof, after which the MSI-X TLP may be matched by client side MSI-X matching registers.

Additionally, or alternatively, if the DPU 462 detects that the TLP is not an MSI-X, the DPU 462 may refrain from marking the TLP as an MSI-X.

At 620, the DPU 462 may transmit a network packet 466 (e.g., a TLP marked as a MSI-X, a TLP marked as not an MSI-X, etc.) to the client device 401, over a communications network (e.g., communications network 103 described with reference to FIG. 1) according to a network protocol described herein. For example, the DPU 462 may tunnel the network packet 466 over the communications network. In an example, the DPU 462 may transmit a tunneled communication including the network packet 466 (e.g., TLP), over an established bridge connection (e.g., CNB).

Figure 7:
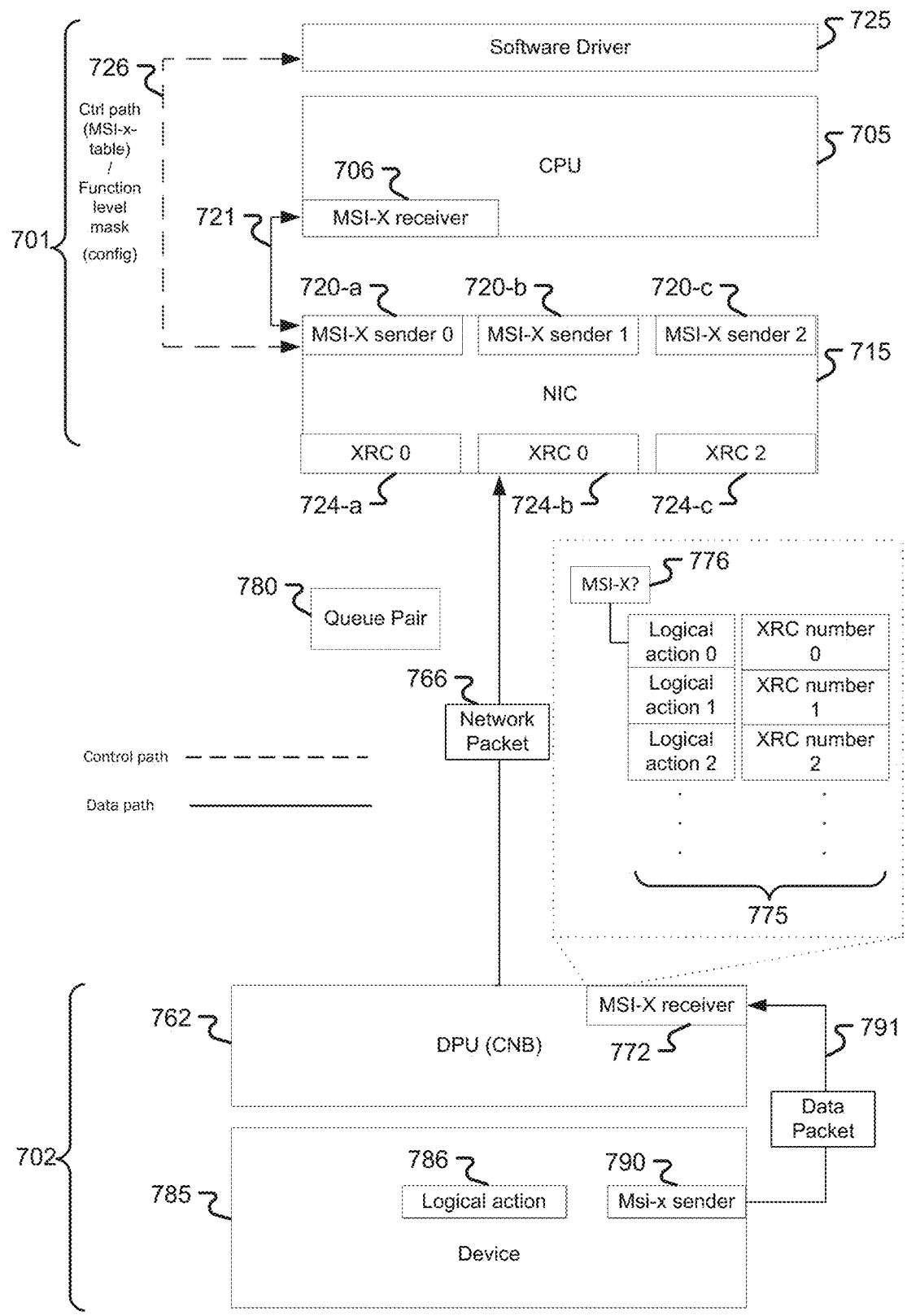
FIG. 7 illustrates an example of a system that supports nested MSI-X handling in accordance with aspects of the present disclosure.

FIG. 7 illustrates an example of a system 700 that supports nested MSI-X handling in accordance with aspects of the present disclosure. For example, the system 700 may support a RDMA with XRC.

The system 700 may include a client device 701 and a server 702. The client device 701 may include examples of aspects of a client device (e.g., client device 101, client device 201, client device 301, client device 401, etc.) described herein. For example, the client device 701 includes a CPU 705, a NIC 715, and software driver 725, aspects of which correspond to like elements described herein. In some optional implementations, the NIC 715 may be a DPU or include a CNB as described herein.

The server 702 may include examples of aspects of a server (e.g., server 102, server 202, server 302, server 402, etc.) described herein. For example, the server 702 includes a DPU 762 and a device 785, aspects of which correspond to like elements described herein.

The system 700 may support the communication of data packets between the client device 701 and the server 702, for example, via communications network (e.g., a communications network 103 described with reference to FIG. 1). The system 700 may support the communication of interrupt signals and/or data via tunneled communications, using an established bridge connection (e.g., a CNB).

With reference to FIG. 7, the system 700 may support implementations in which the server 702 (e.g., DPU 762) may configure and/or maintain MSI-X registers 775 of candidate MSI-X signals described herein. The MSI-X registers 775 may include example aspects of MSI-X registers 440. The MSI-X registers 775 may include a local interrupt configuration described herein.

In an example, the MSI-X registers 775 may include MSI-X signals (vectors), corresponding logical actions (e.g., logical action 0, logical action 1, etc.), and corresponding XRC numbers (e.g., XRC number 0, XRC number 1, etc.). In some aspects, the MSI-X registers 775 may include logical actions that may be triggered by the device 785, in which the logical actions are mapped to a corresponding XRC number.

The device 785 may provide data packets 791 to the DPU 762. The DPU 762 may receive the data packets 791 at an MSI-X receiver 772. The DPU 762 may detect whether a data packet 791 (e.g., a TLP) is an MSI-X (e.g., using the MSI-X registers 775).

In an example, if the DPU 762 (e.g., at the MSI-X receiver 772) receives a data packet 791 and detects that the data packet 791 is an MSI-X, the DPU 762 may use the MSI-X matching registers 775 to identify a corresponding XRC number. For example, if the DPU 762 detects the data packet 791 as an MSI-X (e.g., at 776), the DPU 762 may identify a logical action (e.g., logical action 0, logical action 1, etc.) associated with the MSI-X. The DPU 762 may identify an XRC number (e.g., XRC number 0, XRC number 1, etc.) corresponding to the logical action. For example, using the MSI-X registers 775, the DPU 762 may map the logical action to a XRC number.

An example is described herein in which the DPU 762 (e.g., at the MSI-X receiver 772) receives a data packet 791 and detects that the data packet 791 is an MSI-X. For a logical action 786 (e.g., logic interrupt, etc.), the device 785 may provide (e.g., via MSI-X sender 790) a data packet 791 (e.g., an MSI-X) to the DPU 762. In an example, logical action 786 may be a 'logical action 0' indicated in the MSI-X match registers 775.

The DPU 762 may identify, from the MSI-X match registers 775, that an XRC number (e.g., 'XRC number 0') maps to the logical action 786 (e.g., 'logical action 0'). The device 785 may transmit a SEND packet including the XRC number to the client device 701 in a network packet 766, via the DPU 762, over a communications network (e.g., communications network 103 described with reference to FIG. 1) according to a network protocol described herein. In an example, the DPU 762 may tunnel the network packet 766 over the communications network when transmitting the network packet 766 to the client device 701.

In some additional or alternative aspects, if the DPU 762 (e.g., at the MSI-X receiver 772) receives a data packet 791 and detects that the data packet 791 is not an MSI-X (e.g., the data packet 791 is a general data-write), the device 785 may transmit the data packet 791 in a network packet 766, via the DPU 762, over the communications network.

Accordingly, for example, when the client device 701 (e.g., NIC 715) receives an XRC number, the client device 701 (e.g., NIC 715) may trigger a logical interrupt corresponding to the XRC number, using a corresponding MSI-X handler (e.g., an MSI-X sender). For example, if the client device 701 receives a network packet 766 including 'XRC number 0', the client device 701 (e.g., NIC 715) may trigger a 'logical action 0' using MSI-X sender 720-*a* (e.g., 'MSI-X sender 0'). In some aspects, the NIC 715 may support multiple logical interrupts (e.g., 'logical action 0', 'logical action 1', etc.), each corresponding to a respective XRC number (e.g., 'XRC number 0', 'XRC number 1', etc.).

Figure 8:
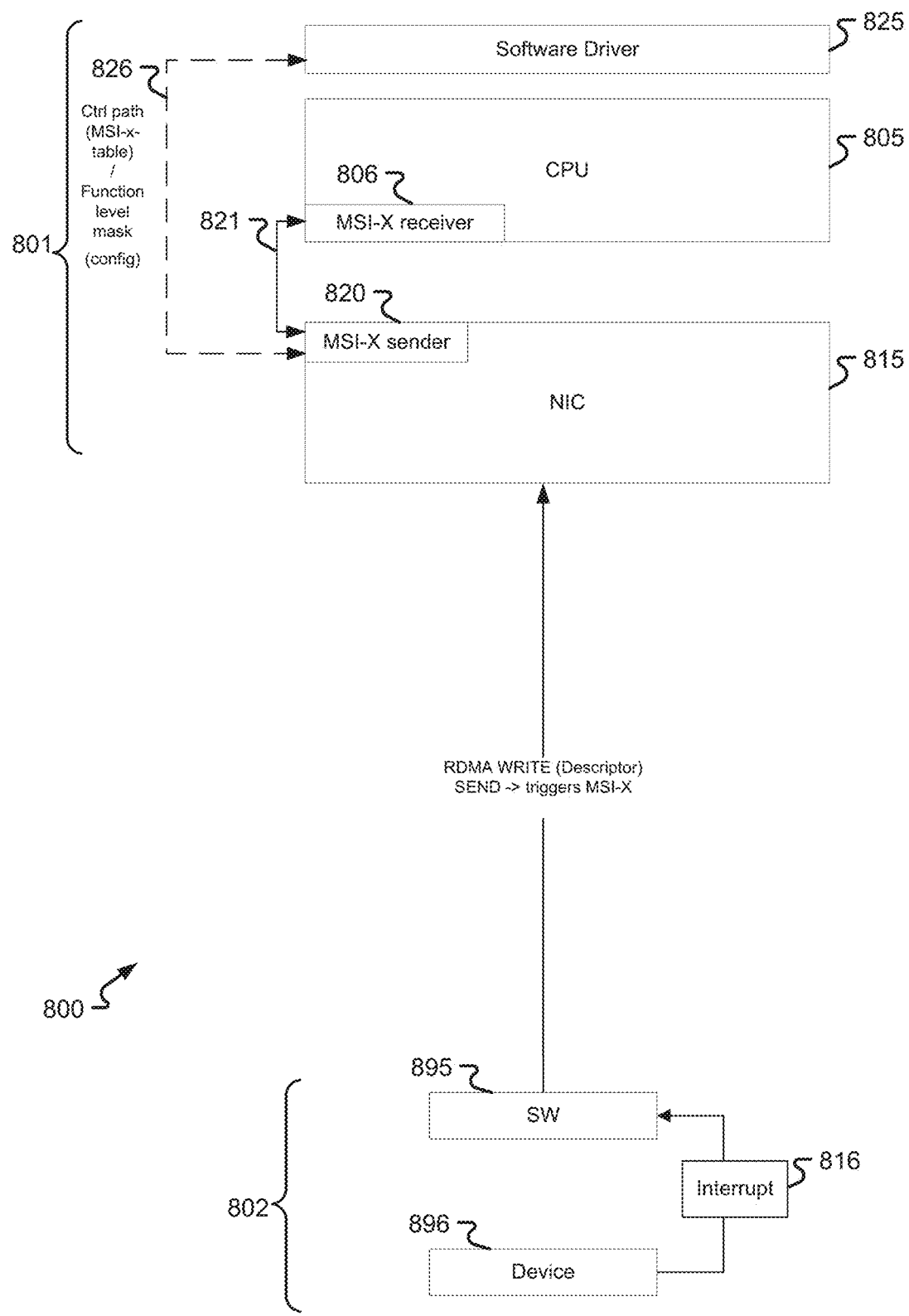
FIG. 8 illustrates an example of a system that supports nested MSI-X handling in accordance with aspects of the present disclosure.

FIG. 8 illustrates an example of a system 800 that supports nested MSI-X handling followed by a SEND command, in accordance with aspects of the present disclosure. For example, the system 800 may support RDMA write (to a descriptor) SEND commands capable of triggering an MSI-X at a client device 801.

The system 800 may include a client device 801 and a server 802. The client device 801 may include examples of aspects of a client device (e.g., client device 101, client device 201, client device 301, client device 401, etc.) described herein. For example, the client device 801 includes a CPU 805, a NIC 815, and software driver 825, aspects of which correspond to like elements described herein. In some optional implementations, the NIC 815 may include a CNB. The server 802 may include examples of aspects of a server (e.g., server 102, server 202, server 302, server 402, etc.) described herein.

The system 800 may support the communication of data packets between the client device 801 and the server 802, for example, via communications network (e.g., a communications network 103 described with reference to FIG. 1). For example, the system 800 may communicate the data packets over the communications network using a non-tunneling protocol.

The server 802 may include a software component 895 and a device 896 (e.g., an SSD). The software component 895 may provide a remote service (or multiple remote services) to the client device 801 (e.g., over the communications network). For example, the system 800 may support remote device emulation (e.g., MSI-X emulation) implemented in association with hosts (e.g., client device 801) and storage systems (e.g., device 896, an SSD).

In an example, the device 896 (e.g., SSD) may not be a PCIe device, and the software component 895 may access the device 896 via a bus different from a PCIE bus. In some aspects, the software component 895 may access the device 896 via software (e.g., execution of computer readable instructions).

In an example, the software driver 825 may provide control signals (e.g., over a control path 826) indicative of an MSI-X table described herein (e.g., address-data configuration, masking, etc.) to an MSI-X sender 820. The MSI-X receiver 806 may receive MSI-X signals (e.g., MSI-X interrupts) from the MSI-X sender 820, for example, via data path 821.

In an example, the software component 895 may receive an interrupt (e.g., interrupt 816) from the device 896. Based on the interrupt, the software component 895 may send an RDMA WRITE (along with a descriptor), followed by a SEND, to the NIC 815. In some aspects, the RDMA write and the SEND may trigger an MSI-X at the client device 801. For example, based on the RDMA WRITE (along with the descriptor) and the SEND, the MSI-X sender 820 may issue and send an MSI-X to the MSI-X receiver 806.

Accordingly, for example, the system 800 may support triggering of a remote interrupt (e.g., in order to terminate a transaction at a CPU 805). For example, the system 800 may support a remote interrupt that is software-initiated (e.g., by the software component 895) and inclusive of RDMA access directly into the CPU 805. In some aspects, the system 800 may support indirect communication via between a client-side (e.g., client device 801) and a server-side (e.g., server 802), via the NIC 815 of the client device 101.

Figure 9:
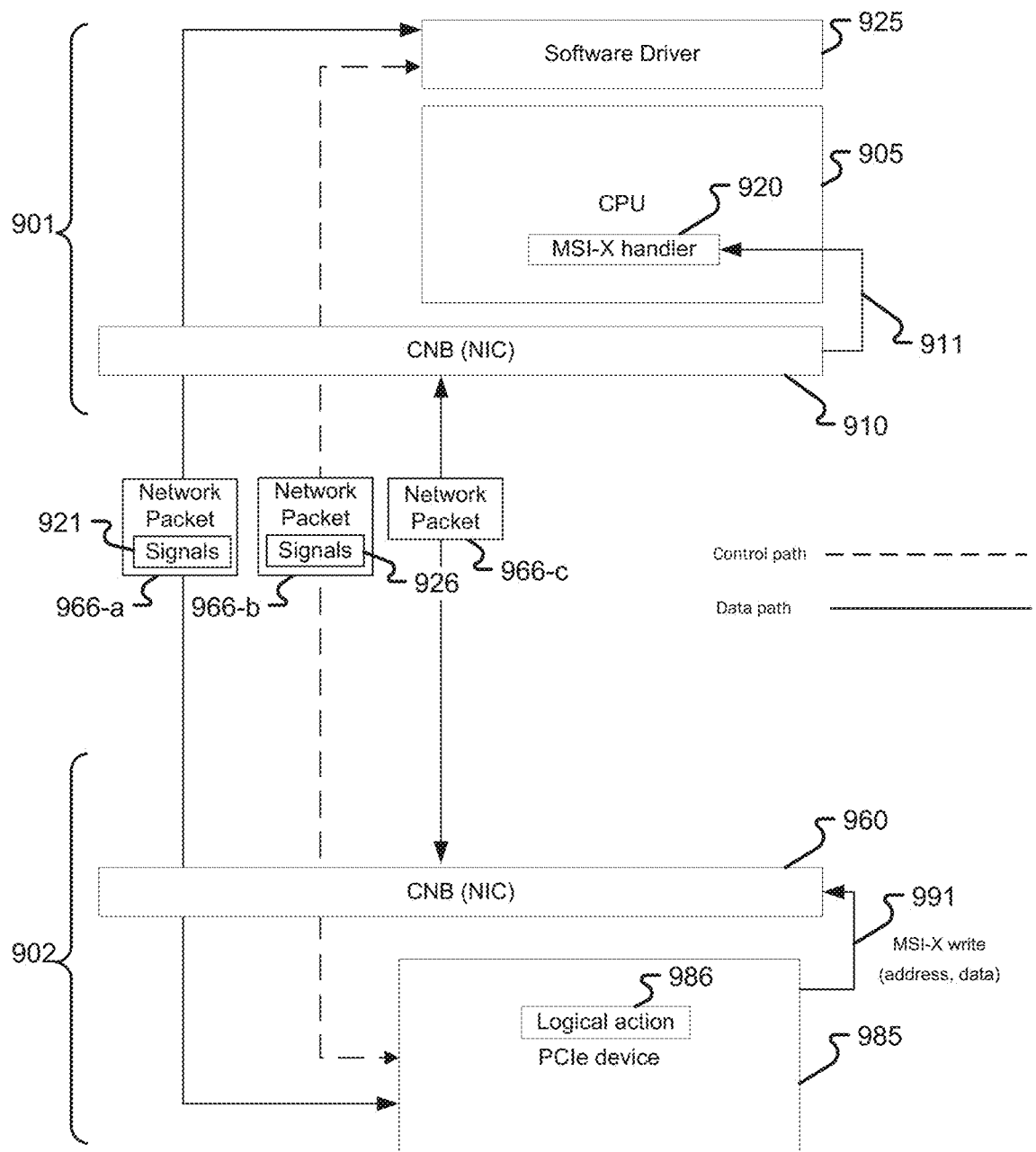
FIG. 9 illustrates an example of system that supports MSI-X emulation on network-tunneled PCIe device in accordance with some data packet networks.

FIG. 9 illustrates an example of system 900 that supports MSI-X emulation on network-tunneled PCIe device in accordance with some data packet networks.

The system 900 may include a client device 901 and a server 902. The client device 901 may include examples of aspects of a client device (e.g., client device 101, etc.) described herein. For example, the client device 901 includes a CPU 905, a CNB 910, and software driver 925, aspects of which correspond to like elements described herein. The server 902 may include examples of aspects of a server (e.g., server 102, etc.) described herein. For example, the server 902 includes CNB 960 and a device 685 (e.g., a PCIe device), aspects of which correspond to like elements described herein.

The system 900 may support the communication of signals between the client device 901 and the server 902, for example, via communications network (e.g., a communications network 103 described with reference to FIG. 1). In the system 900, a PCI tunneling protocol may be used to tunnel all communications between the client device 901 and server 902 over the communications network. For example, the system 900 may support tunneling of signals 921 (e.g., function level mask (PCIe config space)) over a network packet 966-*a*, tunneling of control signals 926 (e.g., control path (MSI-X table), address-data configuration, masking, MSI-X writes, etc.) over a network packet 966-*b*, and tunneling of other network packets 966-*c* across the communications network. For example, the system 900 may support tunneled communications over the communications network, in which the tunneled communications include network packet 966-*a* (e.g., including signals 921), network packet 966-*b* (e.g., including control signals 926), and/or other network packets 966-*c*.

In some cases, unpredictability associated with network behavior may result in unsuccessful (e.g., dropped) packet transmissions. Such unsuccessful packet transmissions (and corresponding multiple retransmission attempts) may interfere with successful interrupt mapping by the CPU 905 (e.g., with respect to function level mask and/or the control path). In some aspects, such repeated packet transmissions without a successful result may result in a system crash at the CPU 905.

Example aspects of the present disclosure as described herein may provide improved network efficiencies compared to the system 900. For example, as illustrated and described at least with reference to FIGS. 2 through 8, aspects of the present disclosure support a control path (e.g., control path 226, control path 326, control path 426, etc.) and a data path (e.g., data path 221, data path 321, data path 421, etc.) implemented at a client device, rather than between a client device and a server.

Figure 10:
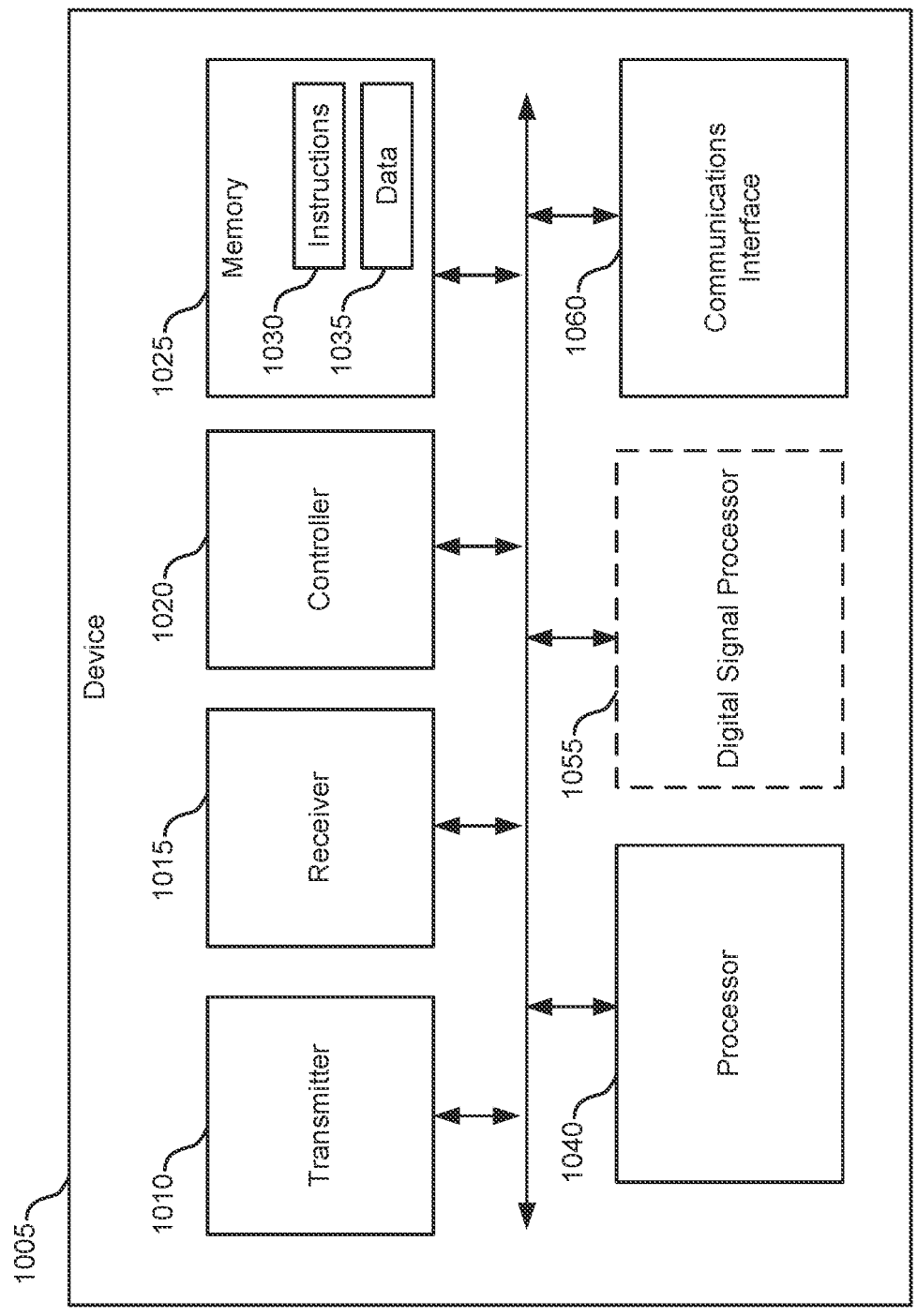
FIG. 10 illustrates an example of system that supports MSI-X emulation on network-tunneled PCIe device in accordance aspects of the present disclosure.

FIG. 10 illustrates an example of a system that supports MSI-X emulation on a network-tunneled PCIe device in accordance with aspects of the present disclosure. The system 1000 may include a device 1005. The device 1005 may include aspects of a client device (e.g., client device 101, client device 201, etc.) or a server (e.g., server 102, server 202, etc.) described herein. In some cases, the device 1005 may be referred to as a computing resource. The device 1005 may perform any or all of the operations described in the present disclosure.

The device 1005 may include a transmitter 1010, a receiver 1015, a communications interface 1020, a controller 1020, a memory 1025, a processor 1040, and a communications interface 1060. In some examples, components of the device 1005 (e.g., transmitter 1010, receiver 1015, controller 1020, memory 1025, processor 1040, communications interface 1060, etc.) may communicate over a system bus (e.g., PCIe bus, control busses, address busses, data busses, etc.) included in the device 1005.

The transmitter 1010 and the receiver 1015 may support the transmission and reception of signals to and from the device 1005. In some aspects, the transmitter 1010 and the receiver 1015 may support the transmission and reception of signals within the device 1005. The transmitter 1010 and receiver 1015 may be collectively referred to as a transceiver. An antenna may be electrically coupled to the transceiver. The device 1005 may also include (not shown) multiple transmitters 1010, multiple receivers 1015, multiple transceivers and/or multiple antennas.

The controller 1020 may be located on a same chip (e.g., ASIC chip) as the transmitter 1010 and/or the receiver 1015. In some cases, the controller 1020 may be located on a different chip as the transmitter 1010 and/or the receiver 1015. In some examples, the controller 1020 may be located on a chip of or on a chip of another device 1005. The controller 1020 may instruct the transmitter 1010 to use one algorithms associated with implementing aspects of the present disclosure described herein. In some examples, the controller 1020 may be a programmed microprocessor or microcontroller. In some aspects, the controller 1020 may include one or more CPUs, memory, and programmable I/O peripherals.

The memory 1025 may be any electronic component capable of storing electronic information. The memory 1025 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 1025 may include instructions 1030 (computer readable code) and data 1035 stored thereon. The instructions 1030 may be executable by the processor 1040 to implement the methods disclosed herein. In some aspects, execution of the instructions 1030 may involve one or more portions of the data 1050. In some examples, when the processor 1040 executes the instructions 1030, various portions of the instructions 1030 and/or the data 1035 may be loaded onto the processor 1040.

The processor 1040 may correspond to one or multiple computer processing devices. For example, the processor 1040 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 1025 of the device 1005). For example, upon executing the instruction sets stored in memory 1025, the processor 1040 may enable or perform one or more functions of the device 1005. In some examples, a combination of processors 1040 (e.g., an advanced reduced instruction set computer (RISC) machine (ARM) and a digital signal processor (DSP) 1055) may be implemented in the device 305.

The communications interface 1060 may support interactions (e.g., via a physical or virtual interface) between a user and the device 1005.

Figure 11:
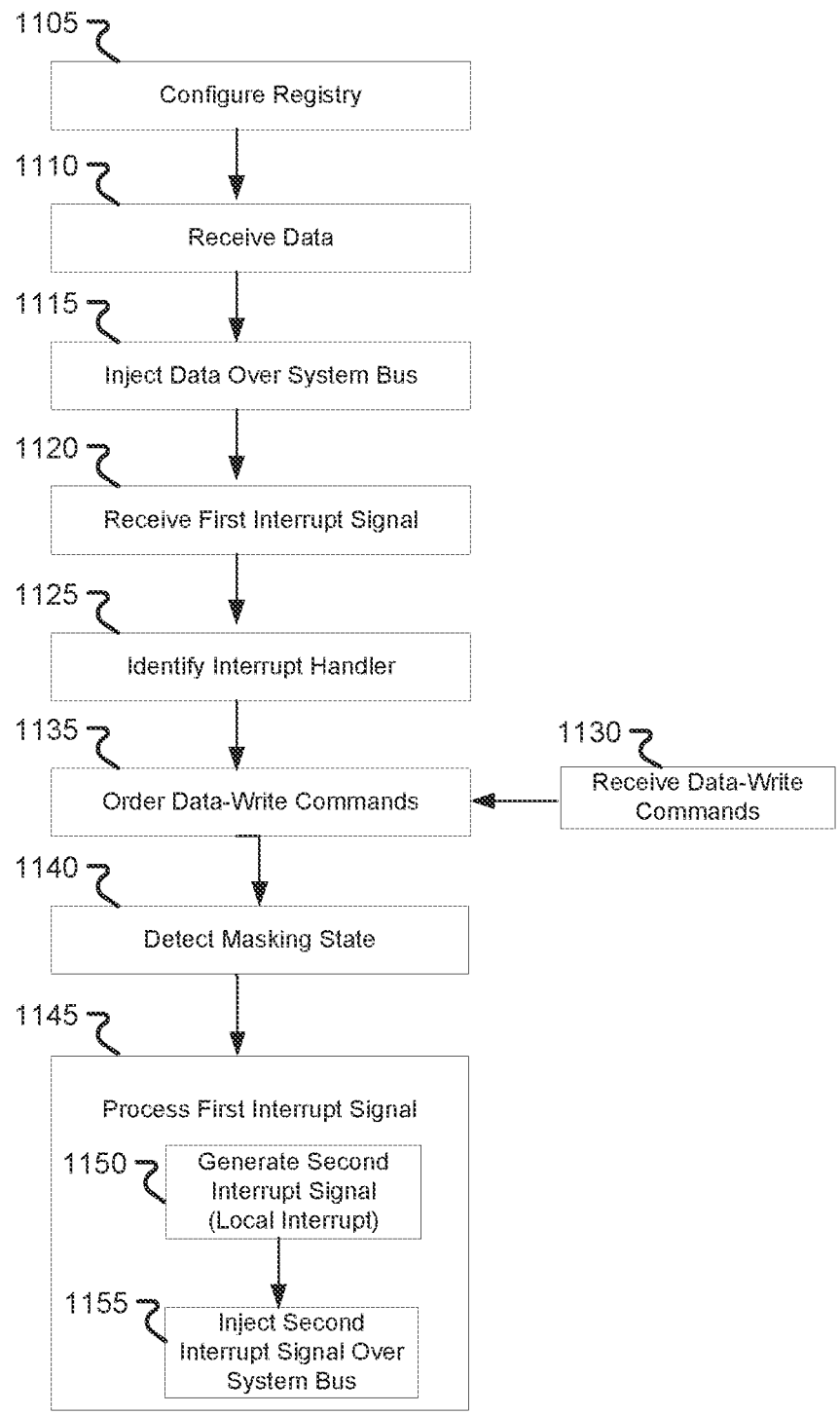
FIG. 11 illustrates an example of a process flow that supports nested MSI-X handling in accordance with aspects of the present disclosure.

FIG. 11 illustrates an example of a process flow 1100 that supports nested MSI-X handling in accordance with aspects of the present disclosure. For example, the process flow 1100 may support a single-end tunneling SEND protocol with XRC.

In the following description of the process flow 1100, the operations may be performed in a different order than the order shown, or the operations may be performed in different orders or at different times. Certain operations may also be left out of the process flow 1100, or other operations may be added to the process flow 1100.

It is to be understood that while a client device 101 is described as performing a number of the operations of process flow 1100, any device (e.g., another client device 101 and/or a server 102 described with reference to FIG. 1) may perform the operations shown.

In an example, the client device 101 may include a system bus, a system bus driver, and electronic circuitry. In some aspects, the system bus may include: a PCI bus, a PCIe bus, an Nvlink bus, or a CXL bus. Aspects of the process flow 1100 described herein as being performed by the client device 101 may be implemented by the electronic circuitry.

At 1105, the client device 101 may configure a registry associated with a set of candidate interrupt signals. In some aspects, the registry may include a set of local interrupt configurations, address information, data values, and masking information corresponding to the set of candidate interrupt signals. In some aspects, the set of local interrupt configurations may include a local interrupt configuration. In some aspects, the set of candidate interrupt signals may include an interrupt signal (e.g., a first interrupt signal later described herein).

At 1110, the client device 101 may receive data from the remote destination over a network protocol. In some aspects, the data is received as part of a network packet. In some examples, the network packet may include a PCIe TLP.

In an example in which the data is received as part of a network packet, the network packet may include at least one of: a PCIe TLP; an explicit network request for data write; and an RDMA write.

At 1115, the client device 101 may inject the data over the system bus.

At 1120, the client device 101 may receive the first interrupt signal from the remote destination over the network protocol. In some aspects, the first interrupt signal may include a MSI capability structure. In some aspects, the first interrupt signal may include a MSI-X capability structure.

In some examples, the first interrupt signal is indicated by an XRC number comprised in a network packet.

In some examples, the first interrupt signal may include an MSI message, an MSI-X message, or a PCI-compatible interrupt hardware support (INTx) emulation.

In an example in which the first interrupt signal is received as part of a network packet, the network packet may include an explicit network request for the first interrupt signal.

At 1125, the client device 101 may identify, from a set of interrupt handlers of a first emulated device, an interrupt handler corresponding to a sender of the first interrupt signal.

At 1130, the client device 101 may receive a set of data-write commands over a network.

At 1135, the client device 101 may order the set of data-write commands based on a set of ordering rules.

At 1140, the client device 101 may detect a masking state of the first interrupt signal.

At 1145, the client device 101 may process the first interrupt signal at the interrupt handler.

Processing the first interrupt signal at the interrupt handler may include (at 1150) generating a second interrupt signal. The second interrupt signal may be a local interrupt. In some aspects, the second interrupt signal may include an MSI message, an MSI-X message, or a PCI-INTx emulation.

In an example, the client device 101 may generate the second interrupt signal (e.g., local interrupt) based on the first interrupt signal and a local interrupt configuration provided by the system bus driver.

In some aspects, the client device 101 may generate the second interrupt signal based on a comparison of first information corresponding to the first interrupt signal to second information stored in a registry associated with a set of candidate interrupt signals. In an example, the first information includes at least one of: address information, a data value, a source network address, a source queue pair (QP), a source requestor identifier, a source process address space identifier (PASID), a destination network address, a destination QP, and an XRC number associated with the first interrupt signal. In some aspects, the second information includes at least one of: address information, a data value, a destination system bus (e.g., destination PCIe link), a requestor identifier, and a PASID associated with the set of candidate interrupt signals. In an example, the system 100 may include a plurality of source system busses and/or destination system busses connected to each of the client device 101 and the server 102, and the client device 101 may differentiate between the buses based on the registry.

In some aspects, the client device 101 may generate the second interrupt signal based on completing the ordering of the set of data-write commands.

In some aspects, the client device 101 may generate the second interrupt signal based on detecting that the masking state is an unmasked state. In some aspects, the client device 101 may generate the second interrupt signal based on an indication of a protocol corresponding to the first interrupt signal. In some aspects, the client device 101 may generate the second interrupt signal based on a result associated with a query (e.g., querying a PBA structure) associated with the first interrupt signal.

Processing the first interrupt signal at the interrupt handler may include (at 1155) injecting the second interrupt signal (e.g., local interrupt) over the system bus.

In some aspects, injecting the second interrupt signal may include transmitting the second interrupt signal to at least one of a second electronic circuitry and the system bus driver. In some aspects, injecting the data and injecting the second interrupt signal may include ensuring the data is made available to the system bus driver, prior to the interrupt handler receiving the second interrupt signal.

In some aspects, the client device 101 may include a first emulated device configured to receive at least one of the first interrupt signal and the data from at least one of a remote device, a second emulated device, and software over the network protocol. In some examples, the at least one of the remote device, the second emulated device, and the software are located at the remote destination. In an example case, the first emulated device may be configured to receive the first interrupt signal from at least one of the remote device, the second emulated device, and the software over the network protocol. In some examples, the at least one of the remote device, the second emulated device, and the software are located at the remote destination.

In some aspects (not illustrated), the client device 101 may establish a bridge connection between the client device 101 and the remote destination. The client device 101 may receive a tunneled communication from the remote destination, over the bridge connection. In an example, the tunneled communication may include the first interrupt signal, the data, or both.

Figure 12:
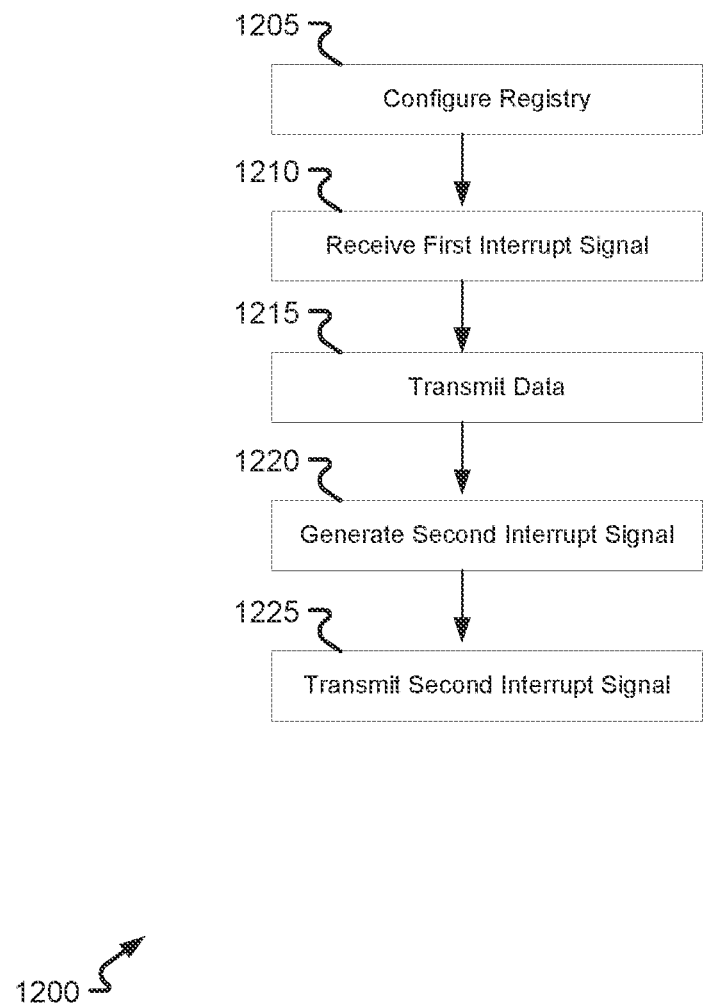
FIG. 12 illustrates an example of a process flow that supports nested MSI-X handling in accordance with aspects of the present disclosure.

FIG. 12 illustrates an example of a process flow 1200 that supports nested MSI-X handling in accordance with aspects of the present disclosure. For example, the process flow 1200 may support a single-end tunneling SEND protocol with XRC.

In the following description of the process flow 1200, the operations may be performed in a different order than the order shown, or the operations may be performed in different orders or at different times. Certain operations may also be left out of the process flow 1200, or other operations may be added to the process flow 1200.

It is to be understood that while a server 102 in some cases, is described as performing a number of the operations of process flow 1100, any device (e.g., another client device 101 and/or a server 102 described with reference to FIG. 1) may perform the operations shown.

The server 102 may include a system bus, a system bus driver, and electronic circuitry. In some aspects, the system bus may include: a PCI bus, a PCIe bus, an Nvlink bus, or a CXL bus. Aspects of the process flow 1200 described herein as being performed by the server 102 may be implemented by the electronic circuitry.

At 1205, the server 102 may configure a registry associated with a set of candidate interrupt signals. In some aspects, the registry may include a set of local interrupt configurations, address information, data values, and masking information corresponding to the set of candidate interrupt signals.

In some aspects, the set of local interrupt configurations may include a local interrupt configuration based on which a local interrupt (e.g., a second local interrupt) is generated at a remote destination. In some aspects, the set of candidate interrupt signals may include an interrupt signal (e.g., a second interrupt signal later described herein).

In an example, the registry includes a set of local interrupt configurations including at least one of a source requestor identifier, a source PASID, a source system bus (e.g., source PCIe link), address information, and data values corresponding to the set of candidate interrupt signals. In an example, the system 100 may include a plurality of source system busses and/or destination system busses connected to each of the server 102 and the client device 101, and the server 102 may differentiate between the buses based on the local interrupt configurations in the registry.

In an example, the registry may indicate an MSI-X emulation protocol type (e.g., (tunneled) TLP, explicit network indication, or XRC). In another example, the registry may indicate a network device selection (e.g., the registry can communicate over a plurality of network devices). In another example, the registry may indicate a network protocol selection (e.g., Ethernet/TCP, Ethernet/RDMA over Converged Ethernet (RoCE), or InfiniBand (IB). In another example, the registry may indicate a network QP selection (e.g., RoCE/IB may involve a QP selection; this may indicate transport: reliable connection (RC)/XRC/dynamically-connected (DC). In another example, the registry may indicate a destination network address selection (e.g., RoCE/IB using DC transport may involve specifying a remote network address). In another example, the registry may indicate an XRC number (e.g., RoCE/IB using XRC transport) selection. In some aspects, the set of candidate interrupt signals includes the second interrupt signal.

At 1210, the server 102 may receive a first interrupt signal (e.g., a first local interrupt) from a device over the system bus.

At 1215, the server 102 may transmit data to a remote destination over a network protocol.

In some examples, the server 102 may transmit the data as part of a network packet, the network packet including at least one of: a PCIe TLP, an explicit network request for data write, and an RDMA write.

At 1220, the server 102 may generate second interrupt signal based on the first interrupt signal. In some aspects, the server 102 may generate an indication of a protocol corresponding to the second interrupt signal.

At 1225, the server 102 may transmit the second interrupt signal to the remote destination over the network protocol.

In some aspects (not illustrated), the server 102 may generate a network packet indicating the second interrupt signal and transmit the network packet to the remote destination over the network protocol.

In some aspects, the server 102 may transmit the second interrupt signal (e.g., to the remote destination) as part of the network packet, the network packet including a PCIe TLP.

In some aspects, the server 102 may transmit the second interrupt signal as part of the network packet, the network packet including an explicit network request for the interrupt signal.

In some aspects, the server 102 may transmit the second interrupt signal and an XRC number as part of the network packet. In an example, the second interrupt signal is indicated by the XRC number included in the network packet.

In some examples, the second interrupt signal may include an MSI message, an MSI-X message, or a PCI-compatible INTx emulation.

In some aspects, generating the second interrupt signal may be based on address information, data values, or both stored in a registry associated with a set of candidate interrupt signals.

In some examples, the server 102 may provide the second interrupt signal to the remote destination in an unmasked state.

In some aspects, the server 102 may include a first emulated device configured to provide at least one of the second interrupt signal and the data to at least one of a remote device, a second emulated device, and software over the network protocol. In an example case, the first emulated device may be configured to provide the second interrupt signal to at least one of the remote device, the second emulated device, and the software over the network protocol. In some examples, the at least one of the remote device, the second emulated device, and the software are located at the remote destination.

In some aspects (not illustrated), the server 102 may establish a bridge connection between the server 102 and the remote destination. The server 102 may transmit a tunneled communication to the remote destination, over the bridge connection. In an example, the tunneled communication may include the second interrupt signal, the data, or both.

Any of the steps, functions, and operations discussed herein can be performed continuously and automatically.

The exemplary apparatuses, systems, and methods of this disclosure have been described in relation to examples of a client device 101 and a server 102. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
    a system bus driver;
    electronic circuitry, wherein the electronic circuitry:
        receives a first interrupt signal from a remote destination over a network protocol;
        generates a second interrupt signal based at least in part on the first interrupt signal and a local interrupt configuration provided by the system bus driver, wherein the second interrupt signal comprises a local interrupt; and
    a first emulated device configured to receive the first interrupt signal from at least one of a remote device, a second emulated device, and software over the network protocol,
    wherein the at least one of the remote device, the second emulated device, and the software is located at the remote destination.

2. The apparatus of claim 1, further comprising:
    a system bus;
    wherein the electronic circuitry:
        receives data from the remote destination over the network protocol;
        injects the data over the system bus; and
        injects the second interrupt signal over the system bus, wherein injecting the data and injecting the second interrupt signal comprise ensuring the data is made available to the system bus driver, prior to an interrupt handler receiving the second interrupt signal.

3. The apparatus of claim 2, wherein the data is received as part of a network packet, the network packet comprising at least one of:
    a peripheral component interconnect express (PCIe) transaction layer packet (TLP);
    an explicit network request for data write; and
    a remote direct memory access (RDMA) write.

4. The apparatus of claim 2, wherein the electronic circuitry:
    establishes a bridge connection between the apparatus and the remote destination; and
    receives a tunneled communication from the remote destination, over the bridge connection,
    wherein the tunneled communication comprises the first interrupt signal, the data, or both.

5. The apparatus of claim 1, wherein the first interrupt signal is received as part of a network packet, the network packet comprising a peripheral component interconnect express (PCIe) transaction layer packet (TLP).

6. The apparatus of claim 1, wherein the first interrupt signal is received as part of a network packet, the network packet comprising an explicit network request for the first interrupt signal.

7. The apparatus of claim 1, wherein the first interrupt signal is indicated by an XRC number comprised in a network packet.

8. The apparatus of claim 1, wherein the electronic circuitry:
    establishes a bridge connection between the apparatus and the remote destination; and
    receives a tunneled communication from the remote destination, over the bridge connection,
    wherein the tunneled communication comprises the first interrupt signal.

9. The apparatus of claim 1, further comprising a system bus, the system bus comprising:
    a peripheral component interconnect (PCI) bus;
    a PCI express (PCIe) bus;
    an Nvlink bus; or
    a compute express link (CXL) bus.

10. The apparatus of claim 1, wherein the electronic circuitry:
    identifies, from a set of interrupt handlers of the first emulated device, an interrupt handler corresponding to a sender of the first interrupt signal; and
    processes the first interrupt signal at the interrupt handler, wherein processing the first interrupt signal at the interrupt handler comprises at least one of:
        the generating of the second interrupt signal; and
        injecting of the second interrupt signal over a system bus.

11. The apparatus of claim 1, wherein the first interrupt signal comprises a message signaled interrupt (MSI) message, an MSI-X message, or a PCI-compatible interrupt hardware support (INTx) emulation.

12. The apparatus of claim 1, wherein the second interrupt signal comprises a message signaled interrupt (MSI) message, an MSI-X message, or a PCI-compatible interrupt hardware support (INTx) emulation.

13. The apparatus of claim 1, wherein generating the second interrupt signal is based at least in part on a comparison of first information corresponding to the first interrupt signal to second information stored in a registry associated with a set of candidate interrupt signals, wherein:

the first information comprises at least one of: address information, a data value, a source network address, a source queue pair (QP), a source requestor identifier, a source process address space identifier (PASID), a destination network address, a destination QP, and an extended reliable connected (XRC) number associated with the first interrupt signal; and the second information comprises at least one of: address information, a data value, a destination system bus, a requestor identifier, and a PASID associated with the set of candidate interrupt signals.

14. The apparatus of claim 1, wherein the electronic circuitry:
configures a registry associated with a set of candidate interrupt signals, wherein:
the registry comprises a set of local interrupt configurations, address information, data values, and masking information corresponding to the set of candidate interrupt signals;
the set of local interrupt configurations comprises the local interrupt configuration; and
the set of candidate interrupt signals comprise the first interrupt signal.

15. The apparatus of claim 1, wherein generating the second interrupt signal is based at least in part on at least one of:
an indication of a protocol corresponding to the first interrupt signal; and
a result associated with a query associated with the first interrupt signal.

16. The apparatus of claim 1, wherein the electronic circuitry:
receives a set of data-write commands over a network; and
orders the set of data-write commands based at least in part on a set of ordering rules,
wherein generating the second interrupt signal is based at least in part on completing the ordering of the set of data-write commands.

17. The apparatus of claim 1, wherein the electronic circuitry:
detects a masking state of the first interrupt signal; and
generates the second interrupt signal based at least in part on detecting that the masking state is an unmasked state.

18. The apparatus of claim 1, wherein the electronic circuitry:
injects the second interrupt signal over a system bus, wherein injecting the second interrupt signal comprises transmitting the second interrupt signal to at least one of second electronic circuitry and the system bus driver.

19. An apparatus comprising:
a system bus; and
electronic circuitry;
wherein the electronic circuitry:
receives a first interrupt signal from a device over the system bus, the first interrupt signal comprising a first local interrupt;
generates a second interrupt signal based at least in part on the first interrupt signal;
transmits the second interrupt signal to a remote destination over a network protocol;
receives data over the system bus; and
transmits the data as part of a network packet to the remote destination over the network protocol, the network packet comprising at least one of:
a peripheral component interconnect express (PCIe) transaction layer packet (TLP);
an explicit network request for data write; and
a remote direct memory access (RDMA) write.

20. The apparatus of claim 19, wherein the electronic circuitry:
establishes a bridge connection between the apparatus and the remote destination; and
transmits a tunneled communication to the remote destination, over the bridge connection,
wherein the tunneled communication comprises the data.

21. The apparatus of claim 19, wherein
the second interrupt signal is included in a second network packet.

22. The apparatus of claim 19, wherein the electronic circuitry transmits the second interrupt signal as part of a second network packet, the second network packet comprising a peripheral component interconnect express (PCIe) transaction layer packet (TLP).

23. The apparatus of claim 19, wherein the electronic circuitry transmits the second interrupt signal as part of a second network packet, the second network packet comprising an explicit network request for the second interrupt signal.

24. The apparatus of claim 19, wherein:
the electronic circuitry transmits the second interrupt signal and an XRC number as part of a second network packet; and
the second interrupt signal is indicated by the XRC number comprised in the second network packet.

25. The apparatus of claim 19, wherein the electronic circuitry:
establishes a bridge connection between the apparatus and the remote destination; and
transmits a tunneled communication to the remote destination, over the bridge connection,
wherein the tunneled communication comprises the second interrupt signal.

26. The apparatus of claim 19, wherein the system bus comprises:
a peripheral component interconnect (PCI) bus;
a PCI express (PCIe) bus;
an Nvlink bus; or
a compute express link (CXL) bus.

27. The apparatus of claim 19, wherein the first interrupt signal comprises a message signaled interrupt (MSI) message, an MSI-X message, or a PCI-compatible interrupt hardware support (INTx) emulation.

28. The apparatus of claim 19, wherein the second interrupt signal comprises a message signaled interrupt (MSI) message, an MSI-X message, or a PCI-compatible interrupt hardware support (INTx) emulation.

29. The apparatus of claim 19, wherein generating the second interrupt signal is based at least in part on address information, data values, or both stored in a registry associated with a set of candidate interrupt signals.

30. The apparatus of claim 19, wherein the electronic circuitry:
configures a registry associated with a set of candidate interrupt signals, wherein:
the registry comprises a set of local interrupt configurations comprising at least one of a source requestor identifier, a source process address space identifier (PASID), a source system bus, address information, and data values corresponding to the set of candidate interrupt signals;

the set of local interrupt configurations comprises a local interrupt configuration based on which a second local interrupt is generated at the remote destination; and the set of candidate interrupt signals comprise the second interrupt signal.

31. The apparatus of claim 19, wherein:

the electronic circuitry configures a registry associated with a set of candidate interrupt signals, wherein the registry indicates at least one of:

a message signaled interrupt (MSI)-X emulation protocol type;

a network device selection;

a network protocol selection;

a network queue pair (QP) selection;

an XRC number selection; and a destination network address selection.

32. The apparatus of claim 19, wherein the electronic circuitry generates an indication of a protocol corresponding to the second interrupt signal.

33. A system comprising:

a system bus;

a system bus driver that is configured to enable functionality of the system bus; and electronic circuitry coupled with the system bus driver, wherein the electronic circuitry:

receives a remotely-generated interrupt signal over a network protocol;

generates a local interrupt based at least in part on the interrupt signal and a local interrupt configuration provided by the system bus driver;

identifies, from a set of interrupt handlers of a first emulated device, an interrupt handler corresponding to a sender of the interrupt signal; and processes the remotely-generated interrupt signal at the interrupt handler, wherein processing the remotely-generated interrupt signal at the interrupt handler comprises at least one of:

the generating of the local interrupt; and injecting the local interrupt over the system bus.

34. The system of claim 33, wherein the electronic circuitry:

receives remotely-generated data over the network protocol;

injects the data over the system bus; and injects the local interrupt over the system bus, wherein injecting the data and injecting the local interrupt comprise ensuring the data is made available to the system bus driver, prior to the interrupt handler receiving the local interrupt.

35. The system of claim 34, wherein the electronic circuitry:

establishes a bridge connection to a remote destination; and receives a tunneled communication from the remote destination, over the bridge connection, wherein the tunneled communication comprises the interrupt signal, the data, or both.

36. A method comprising:

receiving a remotely-generated interrupt signal from a remote destination over a network protocol;

accessing a local system bus driver to obtain a local interrupt configuration;

generating a local interrupt based at least in part on the remotely-generated interrupt signal and the local interrupt configuration;

receiving remotely-generated data;

injecting the data over a system bus; and injecting the local interrupt over the system bus, wherein injecting the data and injecting the local interrupt comprise ensuring the data is made available to the local system bus driver prior to an interrupt handler receiving the local interrupt.

37. A method comprising:

receiving a set of data-write commands;

ordering the set of data-write commands based at least in part on a set of ordering rules;

receiving a locally-generated interrupt signal from a device over a system bus;

generating an interrupt signal based at least in part on the locally-generated interrupt signal and on completing the ordering of the set of data-write commands; and transmitting the interrupt signal to a remote destination over a network protocol.

* * * * *